United States Patent
Krener et al.

(10) Patent No.: US 8,554,361 B2
(45) Date of Patent: Oct. 8, 2013

(54) SYSTEM FOR DETERMINING A RELATIVE LOCATION OF A PLURALITY OF ITEMS UPON A PLURALITY OF PLATFORMS

(75) Inventors: Olivier Krener, Sophia Antipolis Cedex (FR); Loic J Feinbier, Glesenkrichen (DE); Lars Schittko, Kronberg (DE)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 13/412,165

(22) Filed: Mar. 5, 2012

(65) Prior Publication Data

US 2012/0199652 A1  Aug. 9, 2012

Related U.S. Application Data

(62) Division of application No. 11/983,209, filed on Nov. 7, 2007, now Pat. No. 8,185,235.

(60) Provisional application No. 60/932,324, filed on May 30, 2007.

(30) Foreign Application Priority Data

Sep. 19, 2007 (EP) ..................................... 07291112

(51) Int. Cl.
*G06F 7/00* (2006.01)

(52) U.S. Cl.
USPC ........................................................ 700/229

(58) Field of Classification Search
USPC ........... 700/229, 228, 213, 219, 225; 235/385
See application file for complete search history.

(56) References Cited

U.S. PATENT DOCUMENTS

| | | |
|---|---|---|
| 2003/0183697 A1 | 10/2003 | Porter |
| 2003/0209601 A1 | 11/2003 | Chung |
| 2006/0071072 A1* | 4/2006 | McDonald ..................... 235/385 |
| 2006/0293782 A1* | 12/2006 | Rees ............................. 700/230 |

FOREIGN PATENT DOCUMENTS

WO    2006094030 A2    9/2006

* cited by examiner

*Primary Examiner* — Ramya Burgess

(57) ABSTRACT

A system is described for determining a relative location of a plurality of items upon a plurality of platforms. The system may include a memory, an interface, and a processor. The memory may store a first item, a second item, a first period of time and a second period of time. The interface may be operative to communicate with a user and an antenna. The antenna may be able to detect an item for a period of time. The processor may be operative to receive from the antenna, via the interface, the first item, the first period of time, the second item and the second period of time. The processor may determine whether the periods of time overlap. If the periods of time overlap the processor may communicate to the user that the items are upon the same platform, otherwise that the items are on consecutive platforms.

14 Claims, 22 Drawing Sheets

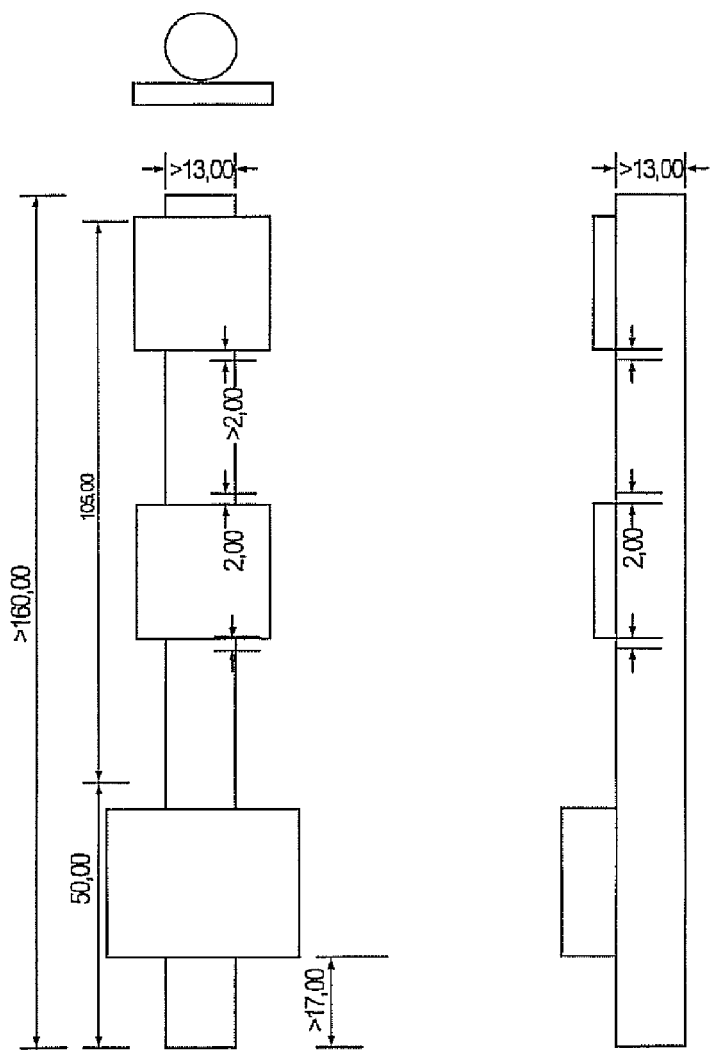
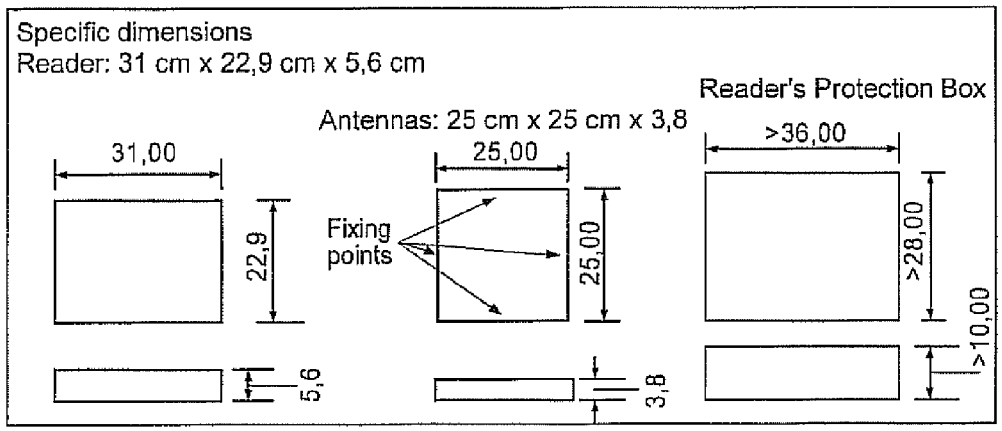
FIG. 10

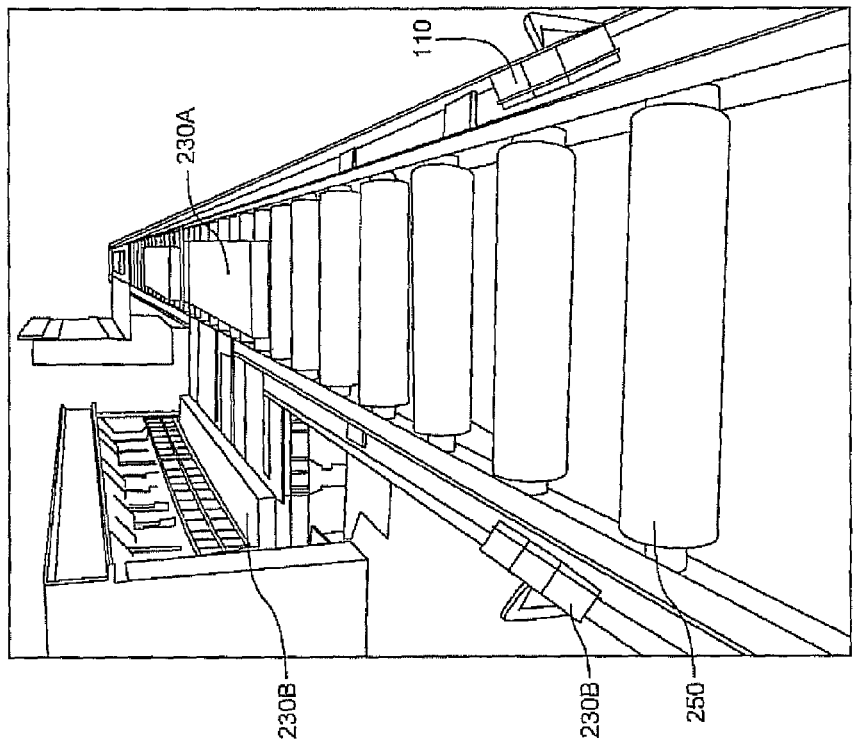
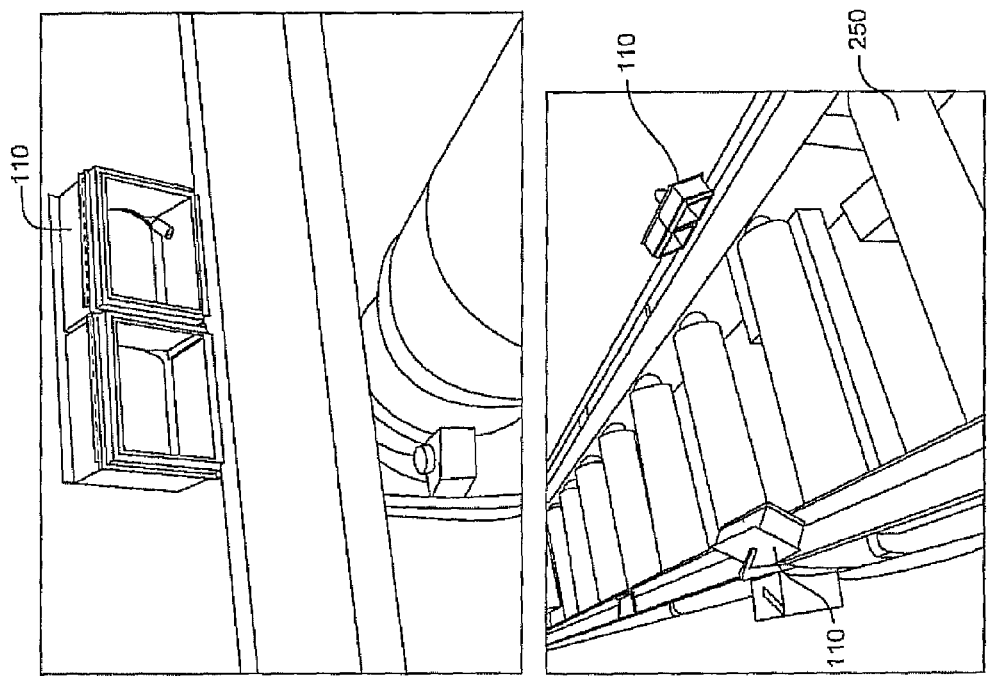
FIG. 15

SYSTEM FOR DETERMINING A RELATIVE LOCATION OF A PLURALITY OF ITEMS UPON A PLURALITY OF PLATFORMS

RELATED U.S. APPLICATIONS

This application is a divisional of, claims the benefit of, and priority to the copending non-provisional patent application Ser. No. 11/983,209, entitled "SYSTEM FOR DETERMINING A RELATIVE LOCATION OF A PLURALITY OF ITEMS UPON A PLURALITY OF PLATFORMS," with filing date Nov. 7, 2007, which claims the benefit of U.S. Provisional Application No. 60/932,324, filed on May 30, 2007, and EP Application No. 07 291 112.6, filed on Sep. 19, 2007, each of which are hereby incorporated by reference in their entirety.

FIELD OF THE INVENTION

The present description relates generally to a system and method, generally referred to as a system, for determining a relative location of a plurality of items upon a plurality of platforms, and more particularly, but not exclusively, to determining a relative location of slabs of steel on train wagons.

BACKGROUND OF THE INVENTION

Hundreds of thousands of slabs of steel may be transported from a steel mill, by rail or other means, in a given year. An individual shipment of steel slabs may have several distinct delivery destinations and each delivery destination may be allocated specific slabs within the shipment. Upon arriving at a destination the shipper may need to locate the slabs of steel within the shipment allocated to the destination. Locating the allocated slabs within the shipment may require manually identifying each slab in the shipment until all the allocated slabs are found. Manual identification of each steel slab may be a slow and time consuming process. A slow process may be particularly undesirable as there may be little time available for unloading, allocating, and reloading the steel slabs. Additionally manual identification of each slab may increase the costs associated with shipping the slabs.

SUMMARY OF THE INVENTION

A system for determining a relative location of a plurality of items upon a plurality of platforms may include a memory, an interface, and a processor. The memory may be operatively connected to the processor and the interface and may store a first item in a plurality of items, a second item in the plurality of items, a first period of time and a second period of time. The interface may be operatively connected to the memory and may be operative to communicate with a user and an antenna. The antenna may be able to detect an item in the plurality of items for a period of time. The processor may be operatively connected to the memory and the interface. The processor may be operative to receive from the antenna, via the interface, the first item, the first period of time, the second item and the second period of time. The first item and the second item may have been detected by the antenna on at least one platform in a plurality of platforms. The processor may determine whether the first period of time and the second period of time overlap. If the periods of time overlap the processor may communicate to the user that the first item and the second item are upon the same platform. Otherwise the processor may communicate to the user that the first item and the second item are on consecutive platforms.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 10 is an illustration of an exemplary reader and antenna construction dimensions for use in the system of FIG. 1 or other systems for determining a relative location of a plurality of items upon a plurality of platforms.

FIG. 15 is an illustration of antennas located by rollers that transport items in the system of FIG. 1 or other systems for determining a relative location of a plurality of items upon a plurality of platforms.

DETAILED DESCRIPTION OF THE INVENTION

A system and method, generally referred to as a system, may relate to determining a relative location of a plurality of items upon a plurality of platforms, and more particularly, but not exclusively, to determining a relative location of slabs of steel on rail wagons. The principles described herein may be embodied in many different forms. The system may identify the relative location of items, such as steel slabs, in transit upon multiple platforms, such as the beds of train wagons. The system may be able to determine which slabs are located on which train wagons. The system may be used to coordinate the unloading, allocating and loading of the items at ports, depots, delivery destinations, or generally any location where the items may be unloaded, allocated and/or loaded.

The system may automate the process of unloading, allocating and loading items upon platforms. The platforms may also be referred to as areas, such as the flatbed area of a train wagon or truck. The system may communicate the data describing the relative location of the items upon the platforms to a device for unloading, allocating, and/or loading items, such as a crane. The data may be used by the device to automatically unload items from passing platforms, such as the beds of train wagons, if they are allocated for delivery at the device's location. The device may also use the data to determine whether there is sufficient space on a passing platform, such as the bed of a train wagon, to load additional items.

The system may communicate data relating to the relative location of items upon a plurality of platforms to a centralized server, such as an inventory server. The server may store the data. The data may later be accessed to provide a purchaser or other interested party with precise information about the location of the items in transit.

The system may provide an immediate and accurate inventory of all items in transit and the relative location of the items upon the platforms used for transport. This data may be used to facilitate the inspection of the items at borders, custom controls, or generally any location where inspections may be performed. The data may enable an inspector to quickly locate items that may need further inspection.

Figure 1:
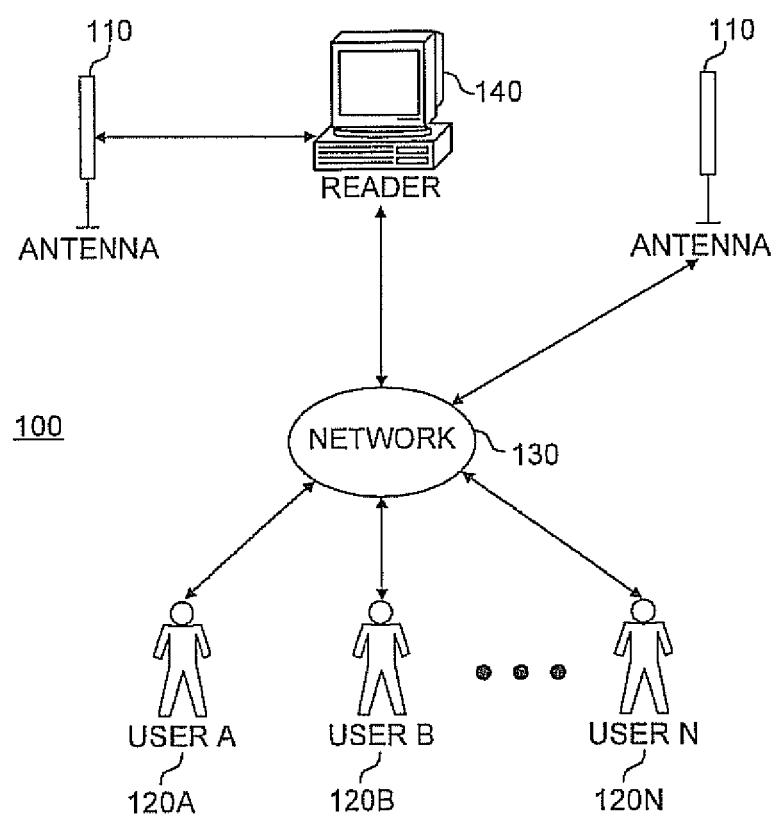
FIG. 1 is a block diagram of a system for determining a relative location of a plurality of items upon a plurality of platforms.

FIG. 1 provides a general overview of a system 100 for determining a relative location of a plurality of items upon a plurality of platforms. Not all of the depicted components may be required, however, and some implementations may include additional components. Variations in the arrangement and type of the components may be made without departing from the spirit or scope of the claims as set forth herein. Additional, different or fewer components may be provided.

The system 100 may include one or more antennas 110, one or more users 120A-N, a reader 140, and a network 130. The antenna 110 may read tags, such as radio frequency identification ("RFID") tags, on passing items, such as slabs of steel. The reader 140 may process data from the antenna 110 related to the passing items to determine the relative location of the items. The reader 140 may communicate the relative location to the one or more users 120A-N via the network 130. The users 120A-N may be persons interested in the relative location of the items, such as system administrators, persons involved in inventory control, or custom inspectors. Alternatively or in addition the users 120A-N may be machines or other servers, such as data server or a machine controlling an automated crane or generally any other apparatus for loading or unloading items.

The antenna 110 may be a radio frequency antenna "RF antenna", or generally any device capable of receiving a data signal from an item. In the case of an RF antenna, the antenna 110 may emit a high frequency electromagnetic wave which may excite the antenna in passing RFID tags and generate an induced current which may be used to communicate data to the antenna 110. The reach of the electromagnetic wave may extend a distance x to the left of the antenna 110 and a distance y to the right of the antenna 110. Passing RFID tags may communicate identifying data to the antenna 110 when they are within reach of the electromagnetic wave. The antenna 110 may identify the time each RFID tag starts transmitting data and the time each RFID tag stops transmitting data. The antenna 110 may then transfer the data, the detection start time, and the detection stop time to the reader 140. Alternatively or in addition an antenna 110, may transfer data directly to the users 120A-N, via the network 130.

The reader 140 may be a radio frequency reader ("RF reader"), such as a machine that may include a processor, memory, a display, and a communication interface. The processor may be operatively connected to the memory, display and the communication interface and may perform tasks at the request of the underlying operating system. The memory may be capable of storing data. The display may be operatively connected to the memory and the processor and may be capable of displaying information. The communication interface may be operatively connected to the memory, and the processor, and may be capable of communicating through the network 130 with the users 120A-N. The reader 140 may be connected to the network 130 in any configuration that supports data transfer. This may include a data connection to the network 130 that may be wired or wireless. One or more readers 140 may be connected, via the network 130, to a readpoint terminal. The readpoint terminal may be a centralized source of storing data related to the readers 140.

The users 120A-N may use a machine to communicate with the reader 140 via the network 130. The machine may include a processor, memory, a display, and a communication interface. The processor may be operatively connected to the memory, display and the communication interface and may perform tasks at the request of the underlying operating system. The memory may be capable of storing data. The display may be operatively connected to the memory and the processor and may be capable of displaying information to the users 120A-N. The communication interface may be operatively connected to the memory, and the processor, and may be capable of communicating through the network 130 with the reader 140.

The network 130 may include wide area networks (WAN), such as the internet, local area networks (LAN), campus area networks, metropolitan area networks, or any other networks that may allow for data communication. The network 130 may include the Internet. The networks 130 may be divided into sub-networks. The sub-networks may allow access to all of the other components connected to the network 130 in the system 100, or the sub-networks may restrict access between the components connected to the network 130. The network 130 may be regarded as a public or private network connection and may include, for example, a virtual private network or an encryption or other security mechanism employed over the public Internet, or the like.

The network 130 may be configured to couple one computing device to another computing device to enable communication of data between the devices. The network 130 may generally be enabled to employ any form of machine-readable media for communicating information from one device to another. The network 130 may include one or more of a wireless network, a wired network, a local area network (LAN), a wide area network (WAN), a direct connection such as through a Universal Serial Bus (USB) port, and the like, and may include the set of interconnected networks that make up the Internet. The network 130 may include any communication method by which information may travel between computing devices.

In operation the antenna 110 may read, or receive, data from passing items. The passing items may be located upon one or more platforms, such as the flat bed area of a train wagon. The antenna 110 may communicate the detected data to the reader 140 along with the time the data was first detectable and the time the data was last detectable. The antenna 110 may be in direct communication with the reader 140, or may be in communication with the reader 140 through the network 130. The reader 140 may use one or more algorithms to process the data received from the antenna 110. The reader 140 may be able to determine the relative location of each passing item based on the data. For example, if the passing items are located upon passing train wagons the reader 140 may determine which train wagon each passing item is relatively located upon.

The reader 140 may communicate the relative location of each item to the users 120A-N, via the network 130. The users 120A-N may store the data in a data store, may analyze the data for inventory purposes, may utilize the data to quickly locate an item, may use the data to automate a loading or unloading process, or generally may use the data to perform any task or action which may be facilitated by knowing the relative location of the items.

Figure 2:
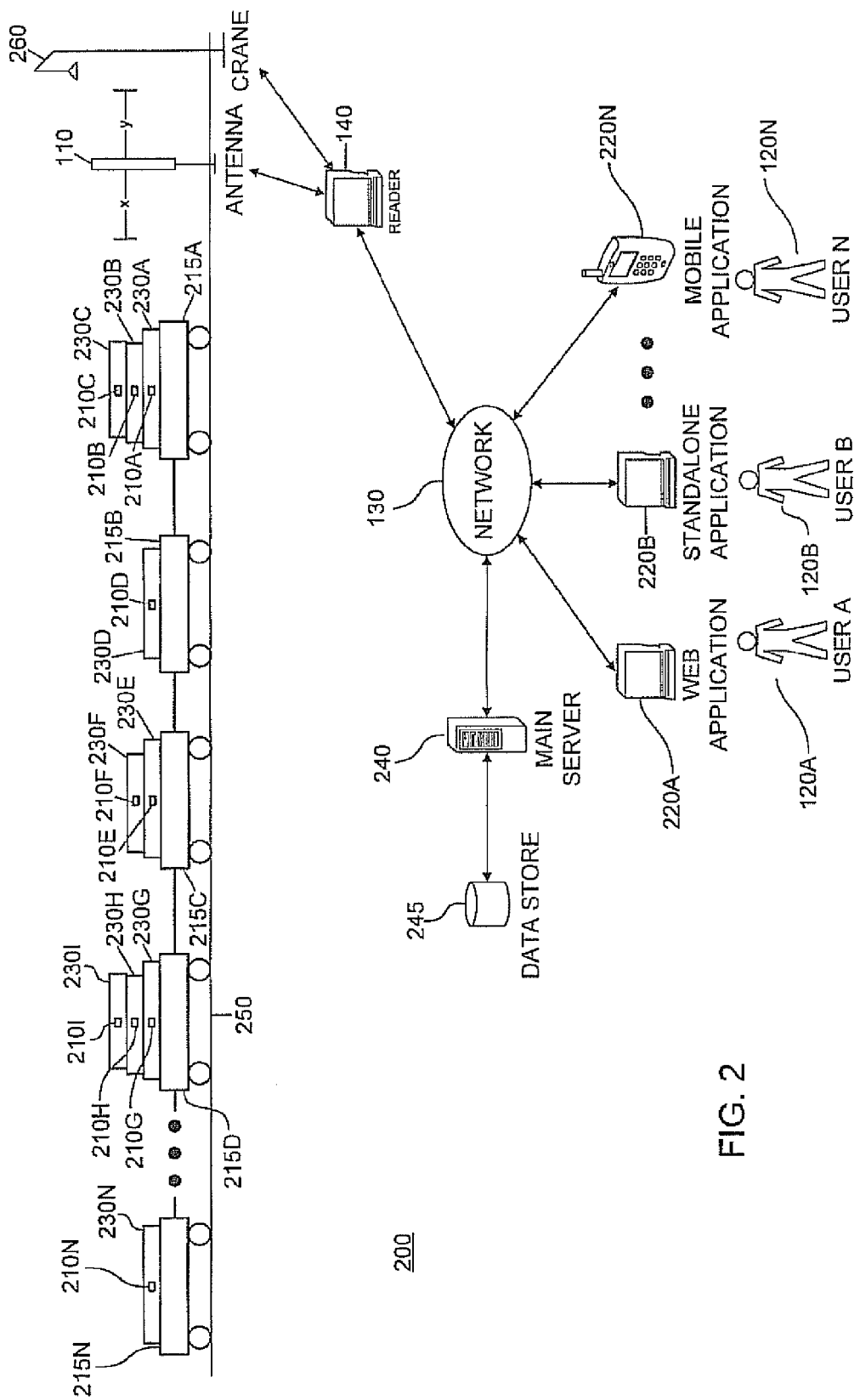
FIG. 2 is block diagram of a simplified view of an implementation of the system of FIG. 1 or other systems for determining a relative location of a plurality of items upon a plurality of platforms.

FIG. 2 provides a simplified view of an implementation 200 of the system of FIG. 1 or other systems for determining a relative location of a plurality of items upon a plurality of platforms. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The implementation 200 may include an antenna 110, a network 130, a reader 140, a main server 240, a data store 245, one or more web applications, standalone applications, mobile applications 220A-N, which may collectively be referred to as client applications for the users 120A-N, or individually as a user client application. The implementation 200 may also include one or more wagons 215A-N, one or more items 230A-N, a track 250, and a crane 260. Each of the items 230A-N may have a tag 210A-N attached.

The main server 240 may communicate with the client applications 220A-N and the reader 140 via the network 130. The main server 240 may receive data from the reader 140 and may store the data in the data store 245. The users 120A-N may access the data stored in the data store 245 through the main server 240. Alternatively or in addition the users 120A-N may communicate with the reader 140. Alternatively or in addition the main server 240 may be a readpoint terminal.

The data store 245 may be operative to store data, such as data relating to the relative location of items 230A-N on the wagons 215A-N. The data store 245 may include one or more relational databases or other data stores that may be managed using various known database management techniques, such as, for example, SQL and object-based techniques. Alternatively or in addition the data store 245 may be implemented using one or more magnetic, optical, solid state or tape drives. The data store 245 may be in communication with the main server 240. Alternatively or in addition the data store 245 may be in communication with the main server 240 through the network 130.

The users 120A-N may use a web application 220A, a standalone application 220B, or a mobile application 220N to communicate with the main server 240 and/or the reader 140, via the network 130. The main server 240 may also communicate to the users 120A-N via the network 130, through the web applications, standalone applications or mobile applications 220A-N.

The web applications, standalone applications and mobile applications 220A-N and the main server 240 may be connected to the network 130 in any configuration that may support data transfer. This may include a data connection to the network 130 that may be wired or wireless. The web application 220A may run on any platform that supports web content, such as a web browser or a computer, a mobile phone, personal digital assistant (PDA), pager, network-enabled television, digital video recorder, such as TIVO®, automobile and/or any appliance capable of data communication.

The standalone application 220B may run on a machine that may include a processor, memory, a display, a user interface and a communication interface. The processor may be operatively connected to the memory, display and the interfaces and may perform tasks at the request of the standalone applications 220B or the underlying operating system. The memory may be capable of storing data. The display may be operatively connected to the memory and the processor and may be capable of displaying information to the user B 120B. The user interface may be operatively connected to the memory, the processor, and the display and may be capable of interacting with a user B 120B. The communication interface may be operatively connected to the memory, and the processor, and may be capable of communicating through the network 130 with the main server 240 and/or the reader 140. The standalone application 220B may be programmed in any programming language that supports communication protocols. These languages may include: SUN JAVA®, C++, C#, ASP, SUN JAVASCRIPT®, asynchronous SUN JAVASCRIPT®, or ADOBE FLASH ACTIONSCRIPT®, amongst others.

The mobile application 220N may run on any mobile device that may have a data connection. The data connection may be a cellular connection, a wireless data connection, an internet connection, an infra-red connection, a Bluetooth connection, or any other connection capable of transmitting data.

The main server 240 may include one or more of the following: an application server, a data store, such as the data store 245, a database server, and a middleware server. The main server 240 may exist on one machine or may be running in a distributed configuration on one or more machines. The main server 240 may be referred to as the server. The main server 240 may implement one or more applications to allow the users 120A-N to access or utilize the data describing the relative location of the items 230A-N. The main server 240 may receive requests from the users 120A-N and may serve data to the users 120A-N based on their requests.

Figure 22:
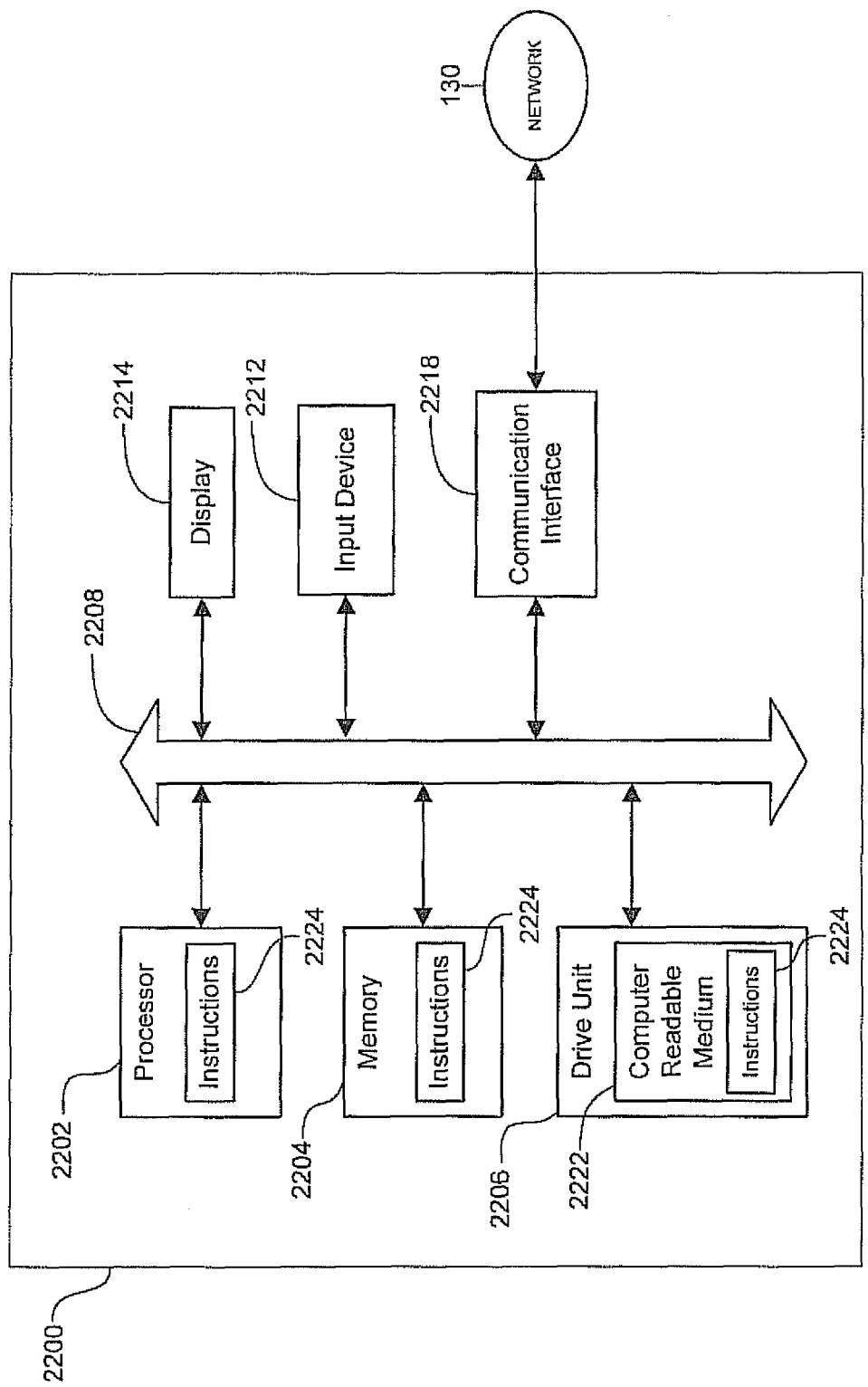
FIG. 22 is an illustration a general computer system that may be used in the system of FIG. 1 or other systems for determining a relative location of a plurality of items upon a plurality of platforms.

The main server 240, the reader 140, and the devices utilized by the users 120A-N may be one or more computing devices of various kinds, such as the computing device in FIG. 22. Such computing devices may generally include any device that may be configured to perform computation and that may be capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, the web applications 220A may employ HTTP to request information, such as a web page, from a web server, which may be a process executing on the main server 240.

The main server 240 may include several configurations of database servers, such as the data store 245, application servers, and middleware servers. Database servers may include MICROSOFT SQL SERVER®, ORACLE®, IBM DB2® or any other database software, relational or otherwise. The application server may be APACHE TOMCAT®, MICROSOFT IIS®, ADOBE COLDFUSION®, or any other application server that supports communication protocols. The middleware server may be any middleware that connects software components or applications.

The wagons 215A-N may be any type of apparatus capable of transporting items 230A-N, such as train cars, sea vessels, semi-trailer trucks, or generally any vehicle capable of transportation. The wagons 215A-N may have a flat surface that one or more items 230A-N may rest upon. The wagons 215A-N may be connected together and may travel on a track 250. The track 250 may be a railroad track or generally may be any track capable of transporting one or more wagons 215A-N.

The items 230A-N may be steel slabs, or may generally be any items that may be transported upon multiple platforms, such as the surfaces of the wagons 215A-N. The items 230A-N may be upon several wagons 215A-N. For example, in FIG. 2, the item A 230A, the item B 230B and the item C 230C may be upon the wagon A 215A. The item D 210D may be upon the wagon B 215B. The item E 210E and the item F 210F may be upon the wagon C 215 C. The item H 210H, the item G 210G and the item I 210I may be upon the wagon D 215D. The item N 230N may be upon the wagon 215N.

The items 230A-N may have a tag 210A-N attached, such as the tag in FIG. 8 below. In the case of an antenna 110 that is an RF antenna, the tags 210A-N may be RFID tags. In the case of RFID tags, the tags 210A-N may include a microchip and an antenna. The microchip may store data, such as a ten-digit number code which may be used to identify the item 230A-N the tag 210A-N is attached to. The antenna 110 may emit a high frequency electromagnetic wave. When the tags 210A-N pass within the range of the electromagnetic wave the electromagnetic wave may excite the antenna in the tags 210A-N and generate an induced current. The current may activate the microchip which may then send the stored data, such as the ten-digit code, to the antenna 110. The microchip may continuously transfer the stored data until the tag 230A-N moves out of range of the electromagnetic wave emitted by the antenna 110. The antenna 110 may communicate the received data to the reader 140. The reader 140 may use the data to determine which wagon 215A-N each item 210A-N may be transported upon.

The crane 260 may be a device capable of loading and/or unloading the items 230A-N from the wagons 215A-N. The crane 260 may be in communication with the reader 140 and/or the main server 240. Alternatively or in addition the crane 260 may be in direct communication reader 140 and/or the main server 240, or may be in communication with the reader 140 and/or the main server 240 through the network 130. The crane 260 may receive loading and/or unloading instructions from the reader 140, and/or the main server 240. The instructions may be based on which wagon 215A-N each item 230A-N may be transported upon. The crane 260 may only load and unload particular wagons 215A-N, depending on which items 230A-N are located on each of the wagons 215A-N.

The crane 260 may be positioned a determined distance from the antenna 110 so that unloading the wagons 215A-N may be automated. As each of the wagons 215A-N pass by the antenna 110, the reader 140 may determine which items 230A-N are upon each of the wagons 215A-N. The reader 140 may communicate the information to the crane 260. The crane 260 may use the information to efficient unload the items 230A-N from the wagons 215A-N. The crane 260 may unload items 230A-N from the wagon A 215A allocated for the location of the crane 260. The crane 260 may load items onto the wagon A 215A if the information from the reader 140 indicates that the wagon A 215A is not full.

Figure 3:
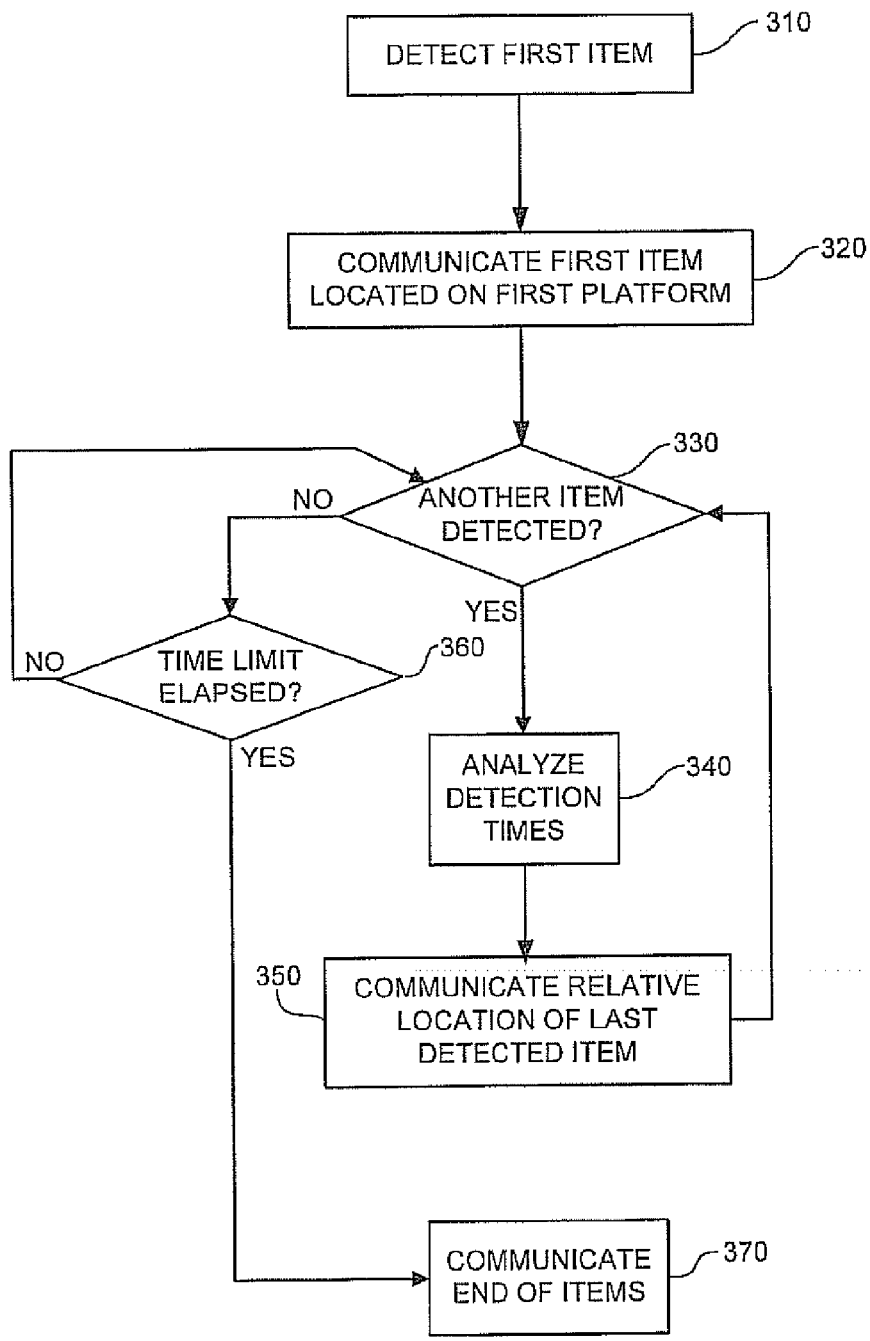
FIG. 3 is a flowchart illustrating the operations of the system of FIG. 1, or other systems for determining a relative location of a plurality of items upon a plurality of platforms.

FIG. 3 is a flowchart illustrating the operations of the system of FIG. 1, or other systems for determining a relative location of a plurality of items upon a plurality of platforms. The operations of the system 100 may be depicted in a flowchart for explanatory purposes. The operations of the system 100 may execute linearly, as depicted in the flowchart, or may execute in parallel to one another. For example, each operation identified in the flowchart illustrated in FIG. 3 may run simultaneously in the system 100.

At block 310 the antenna 110 may detect the tag A 210A of the first item A 230A in a shipment. The antenna 110 may communicate the information describing the detection of the item A 230A to the reader 140. The information may include the time the item A 230A first passed into range of the antenna 110, the time the item A 230A passed out of range of the antenna 110, and any data describing the item A 230A communicated to the antenna 110 by the tag A 210A. The reader 140 may determine that the item A 230A is located on the first platform, such as the wagon A 215A. At block 320 the reader 140 may communicate the location of the item A 230A, and any information describing the item A 230A, to at least one of the main server 240, the users 120A-N, and/or the crane 160.

At block 330 the system 100 may determine if the antenna 110 detects another item. If at block 330 another item is not detected by the antenna 110 the system 100 may move to block 360. At block 360 the system 100 may determine if the time limit has elapsed. The time limit may be the period of time the system 100 may continue to attempt to detect items 230A-N in the current shipment. Once the time limit elapses the system 100 may make the determination that all of the items 230A-N on the shipment passed the range of the antenna 110. The system 100 may determine the time limit based on the average size of the shipments, the lengths of the items 230A-N being transported, the velocity of the items 230A-N or generally any other variables that may effect the detection time intervals.

If at block 360 the system 100 determines that the time limit has elapsed, the system 100 may move to block 370. At block 370 the reader 140 may communicate to the main server 240, the users 120A-N, and/or the crane 160 that the entire shipment has passed the antenna 110. Alternatively or in addition the reader 140 may communicate there are no more items to be detected on the last platform.

If at block 360 the system 100 determines that the time limit has not elapsed, the system 100 may return to block 330 and continue to wait for the antenna 110 to detect additional items. If at block 330 the antenna 110 detects another item, the antenna 110 may communicate the detection data of the currently detected item to the reader 140 and the system 100 may move to block 340. At block 340 the reader 140 may analyze the detection times of the detected item and the previously detected items. The analysis may utilize one or more algorithms, such as a time interval algorithm, an average time interval algorithm, and an overlapping time interval algorithm. A flowchart illustrating the time interval algorithm can be found in FIG. 4 below, a flowchart illustrating the average time interval algorithm can be found in FIG. 5 below and a flowchart illustrating the overlapping time interval algorithm can be found in FIG. 6 below. The analysis of the detection times of the previous two items may enable the reader 140 to determine whether the currently detected item is located on either the same wagon as the previously detected item or the next wagon.

The algorithms may be used to calculate the relative location of the items 230A-N. The algorithm may identify the wagon 215A-N of the shipment without tracking the wagons 215A-N themselves. Each wagon 215A-N may carry a determined number of items 230A-N, such as a maximum of four items 230A-N. Multiple wagons 215A-N may be combined to a full train which may be one shipment. An automatic departure notice and validation that the items 230A-N left the yard may be sent upon departure. Potential shipping errors may be caught and prevented, such as with respect to wrong items 230A-N being shipped.

At block 350 the reader 140 may communicate the determined location of the last detected item to the main server 240, the users 120A-N, or the crane 160. Alternatively or in addition the detection times may be communicated directly to the main server 240 and the main server 240 may perform the analysis on the detection times. After communicating the location of the last detected item the system 100 may return to block 330 and determine whether the antenna 110 detected another item.

Figure 4:
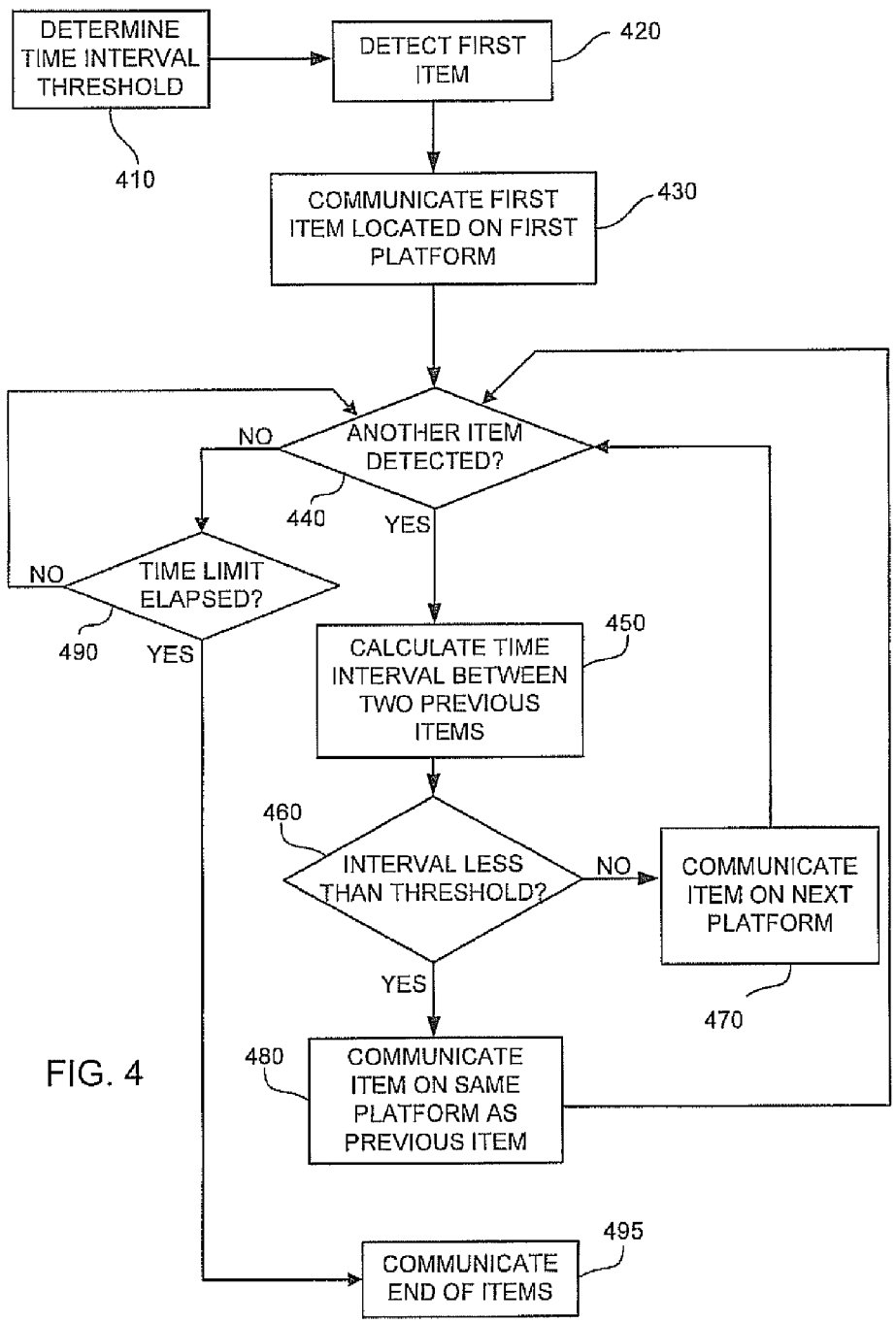
FIG. 4 is a flowchart illustrating the steps of a time interval algorithm in the system of FIG. 1, or other systems for determining a relative location of a plurality of items upon a plurality of platforms.

FIG. 4 is a flowchart illustrating the steps of a time interval algorithm in the system of FIG. 1, or other systems for determining a relative location of a plurality of items upon a plurality of platforms. The operations of the system 100 may be depicted in a flowchart for explanatory purposes. The operations of the system 100 may execute linearly, as depicted in the flowchart, or may execute in parallel to one another. For example, each operation identified in the flowchart illustrated in FIG. 3 may run simultaneously in the system 100.

At block 410 the system 100 may determine a time interval threshold. The time interval threshold may indicate the maximum time that may elapse between the detection of two items located on the same platform. For example, if the time interval threshold was set at 1 second, any two consecutive items detected within 1 second of each other may be determined to be located on the same platform. The system 100 may determine the time interval threshold based on the average size of the shipments, the lengths of the items 230A-N being transported or the lengths of the platforms, such as the wagons 215A-N, the velocity of the items 230A-N or generally any other variables that may effect the detection time intervals.

At block 420 the antenna 110 may detect the tag A 210A of a first item A 230A in a shipment. The antenna 110 may communicate the information describing the detection of the item A 230A to the reader 140, such as the time the item A 230A first passed into range of the antenna 110, the time the item A 230A passed out of range of the antenna 110, and any data describing the item A 230A communicated to the antenna 110 by the tag A 210A. The reader 140 may determine that the item A 230A is located on the first platform, the wagon A 215A. At block 430 the reader 140 may communicate the location of the item A 230A, and any information describing the item A 230A, to the main server 240, the users 120A-N, and/or the crane 160.

At block 440 the system 100 may determine if the antenna 110 detects another item. If at block 440 another item is not detected by the antenna 110 the system 100 may move to block 490. At block 490 the system 100 may determine if the time limit has elapsed. The time limit may be the period of time the system 100 may continue to attempt to detect items 230A-N in the current shipment. Once the time limit elapses the system 100 may make the determination that all of the items 230A-N on the shipment passed the range of the antenna 110. The system 100 may determine the time limit based on the average size of the shipments, the lengths of the items 230A-N being transported, the velocity of the items 230A-N or generally any other variables that may effect the detection time intervals.

If at block 490 the system 100 determines that the time limit has elapsed, the system 100 may move to block 495. At block 495 the reader 140 may communicate to the main server 240, the users 120A-N, and/or the crane 160 that the entire shipment has passed the antenna 110. Alternatively or in addition the reader 140 may communicate that there are no more items to be detected on the last platform.

If at block 490 the system 100 determines that the time limit has not elapsed, the system 100 may return to block 440 and continue to wait for the antenna 110 to detect additional items. If at block 40 the antenna 110 detects another item, the antenna 110 may communicate the detection data of the currently detected item to the reader 140 and the system 100 may move to block 450. At block 450 the reader 140 may calculate the time interval between the most recent detected item and the item detected immediately prior. The time interval may be calculated by determining the difference between the first detection times of the items, the difference between the last detection times of the items, or the difference between the midpoints of the first and last detection times of the items.

At block 460 the reader 140 may determine whether the calculated time interval is less than the time interval threshold. If the time interval is not less than the time interval threshold, the reader 140 may determine that the most recent detected item is not located on the same platform as the item detected immediately prior. Thus, the reader 140 may determine that the most recent detected item is located on the next platform. At block 470 the reader 140 may communicate to the main server 240, the users 120A-N, or the crane 160 that the most recent detected item is located on the next platform. The reader 140 may also communicate any identifying information about the item communicated to the antenna 110 by the tag. After communicating the information the system 100 may return to block 440 and determine if the antenna 110 detected another item.

If at block 460 the reader 140 determines that the calculated time interval is less than the time interval threshold the system 100 may move to block 480. At block 480 the reader 140 may determine that the most recent detected item is located on the same platform as the item detected immediately before it. The reader 140 may communicate to the main server 240, the users 120A-N, or the crane 160 that the current detected item is located on the same platform as the previous detected item. The system 100 may then return to block 440 and determine whether the antenna 110 detects another item.

Figure 5:
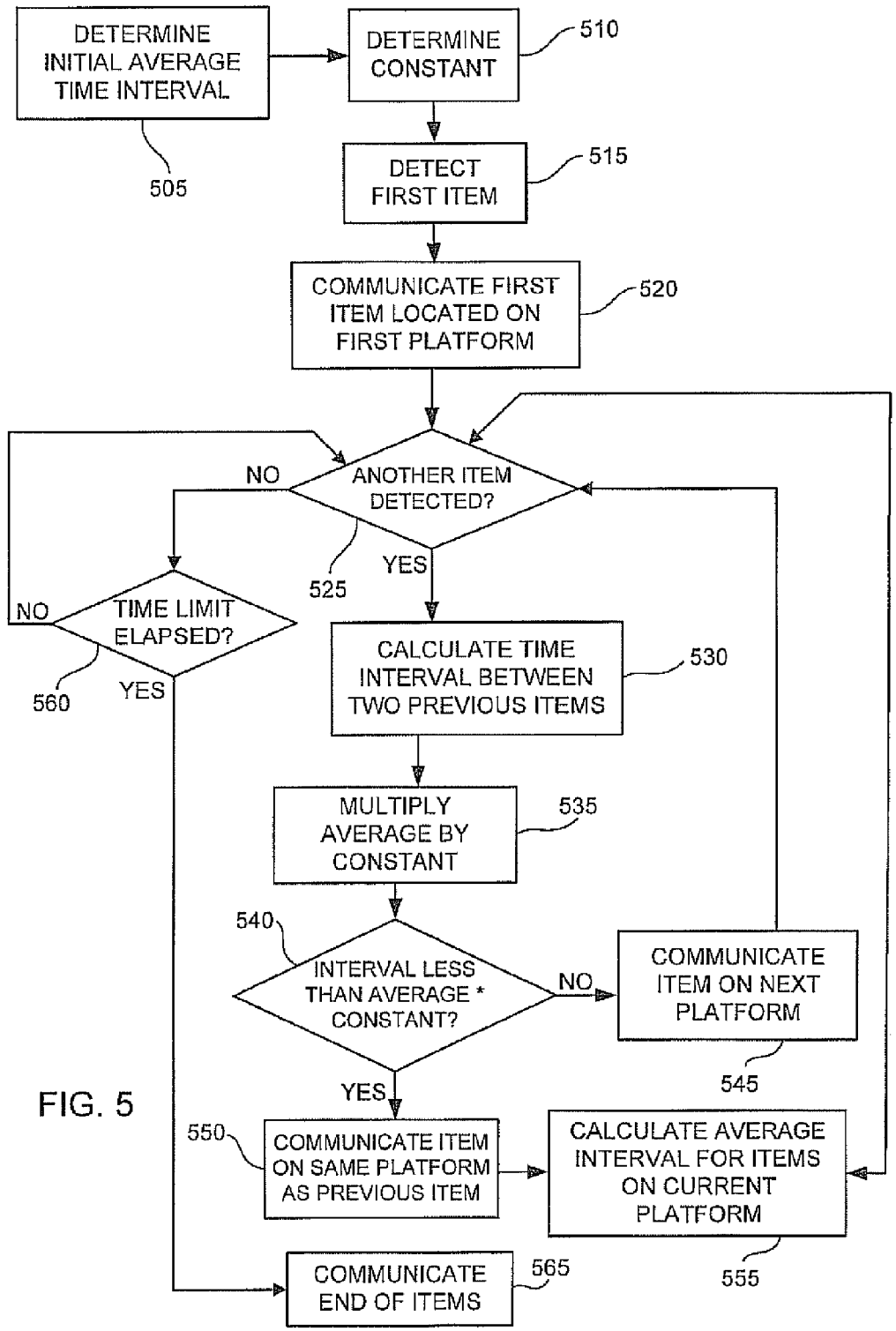
FIG. 5 is a flowchart illustrating the steps of an average time interval algorithm in the system of FIG. 1, or other systems for determining a relative location of a plurality of items upon a plurality of platforms.

FIG. 5 is a flowchart illustrating the steps of an average time interval algorithm in the system of FIG. 1, or other systems for determining a relative location of a plurality of items upon a plurality of platforms. The operations of the system 100 may be depicted in a flowchart for explanatory purposes. The operations of the system 100 may execute linearly, as depicted in the flowchart, or may execute in parallel to one another. For example, each operation identified in the flowchart illustrated in FIG. 5 may run simultaneously in the system 100.

At block 505 the system 100 may determine an initial average interval. The initial average interval may be a time interval threshold or may be a separate time interval. At block 510 the system 100 may determine a constant to be used in the algorithm for determining whether an item is located on the same platform as the previous detected item or is on the next platform.

At block 515 the antenna 110 may detect the tag A 210A of a first item A 230A in a shipment. The antenna 110 may communicate the information describing the detection of the item A 230A to the reader 140, such as the time the item A 230A first passed into range of the antenna 110, the time the item A 230A passed out of range of the antenna 110, and any data describing the item A 230A communicated to the antenna 110 by the tag A 210A. The reader 140 may determine that the item A 230A is located on the first platform, the wagon A 215A. At block 520 the reader 140 may communicate the location of the item A 230A, and any information describing the item A 230A, to the main server 240, the users 120A-N, and/or the crane 160.

At block 525 the system 100 may determine if the antenna 110 detects another item. If at block 525 another item is not detected by the antenna 110 the system 100 may move to block 560. At block 560 the system 100 may determine if the time limit has elapsed. The time limit may be the period of time the system 100 may continue to attempt to detect items 230A-N in the current shipment. Once the time limit elapses the system 100 may make the determination that all of the items 230A-N on the shipment passed the range of the antenna 110. The system 100 may determine the time limit based on the average size of the shipments, the lengths of the items 230A-N being transported, the velocity of the items 230A-N or generally any other variables that may effect the detection time intervals.

If at block 560 the system 100 determines that the time limit has elapsed, the system 100 may move to block 565. At block 565 the reader 140 may communicate to the main server 240, the users 120A-N, and/or the crane 160 that the entire shipment has passed the antenna 110. Alternatively or in addition the reader 140 may communicate that there are no more items to be detected on the last platform.

If at block 560 the system 100 determines that the time limit has not elapsed, the system 100 may return to block 525 and continue to wait for the antenna 110 to detect additional items. If at block 525 the antenna 110 detects another item, the antenna 110 may communicate the detection data of the currently detected item to the reader 140 and the system 100 may move to block 530. At block 530 the reader 140 may calculate the time interval between the detection of the last detected item and the item detected immediately before it. At block 535 the reader 140 may multiply the current average time interval by the constant.

At block 540 the reader 140 may determine whether the time interval is less than the result of the average time interval multiplied by the constant. If the time interval is not less than the result of the average time interval multiplied by the constant the system 100 may move to block 545. At block 545 the reader 140 may communicate to the main server 240, the users 120A-N, or the crane 160 that the last detected item is located on the next platform. In this case the average may not change, and the new average may be initialized to the previous average. The system 100 may then return to block 525 and determine if the antenna 110 detected another item.

If, at block 540, the time interval is less than the result of the average time interval multiplied by the constant the system 100 may move to block 550. At block 550 the reader 140 may communicate to the main server 240, the users 120A-N, or the crane 160 that the current detected item is located on the same platform as the item detected immediately before it. At block 555 the reader 140 may calculate an updated average time interval. The average time interval may be calculated by taking the average of the time intervals between each items determined to be on the same platform as the current detected item. After updating the average time interval the system 100 may return to block 525 and determine if the antenna 110 detects another item.

Figure 6:
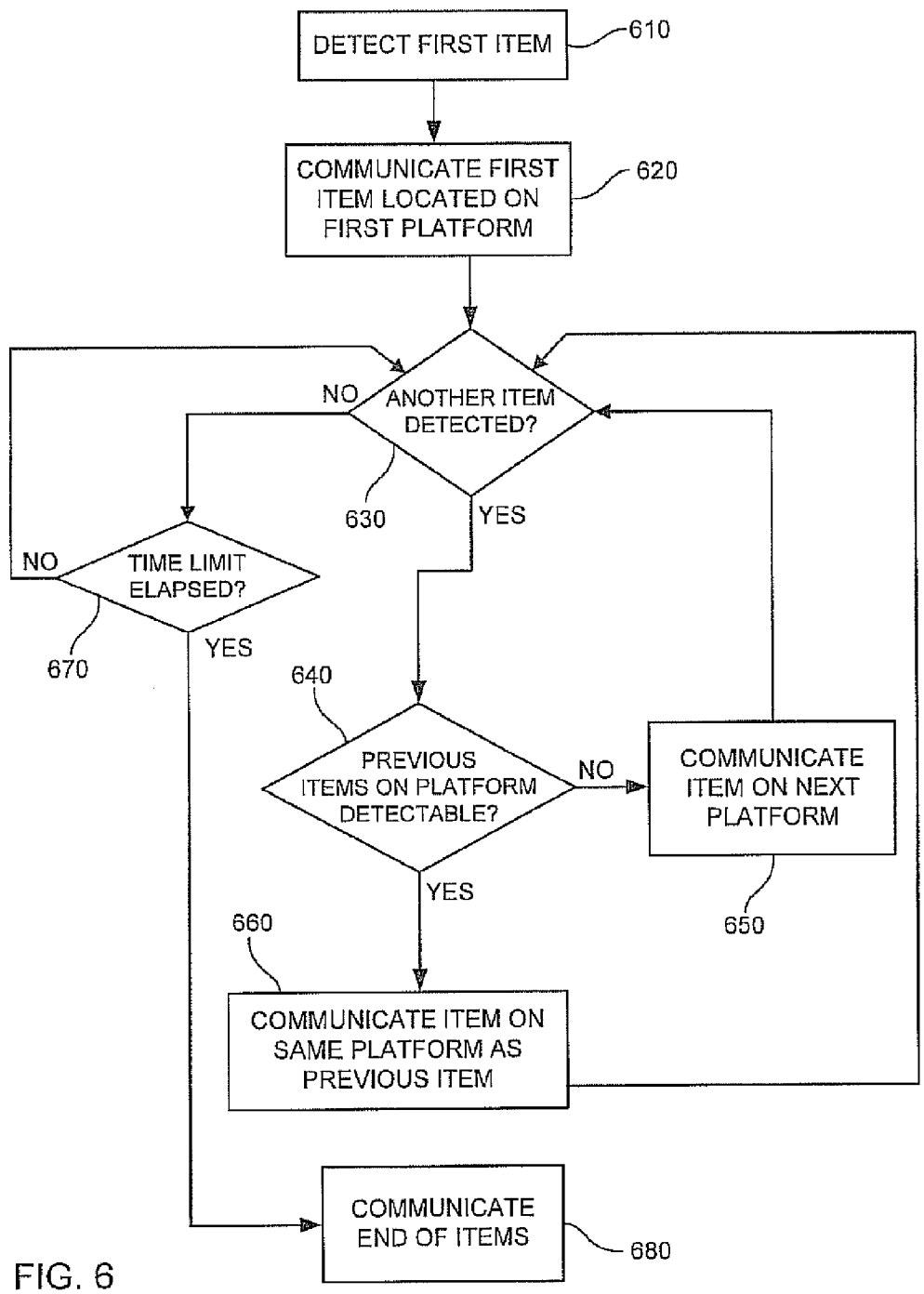
FIG. 6 is a flowchart illustrating the steps of an overlapping detection time interval algorithm in the system of FIG. 1, or other systems for determining a relative location of a plurality of items upon a plurality of platforms.

FIG. 6 is a flowchart illustrating the steps of an overlapping detection time algorithm in the system of FIG. 1, or other systems for determining a relative location of a plurality of items upon a plurality of platforms. The operations of the system 100 may be depicted in a flowchart for explanatory purposes. The operations of the system 100 may execute linearly, as depicted in the flowchart, or may execute in parallel to one another. For example, each operation identified in the flowchart illustrated in FIG. 6 may run simultaneously in the system 100.

At block 610 the antenna 110 may detect the tag A 210A of a first item A 230A in a shipment. The antenna 110 may communicate the information describing the detection of the item A 230A to the reader 140, such as the time the item A 230A first passed into range of the antenna 110, the time the item A 230A passed out of range of the antenna 110, and any data describing the item A 230A communicated to the antenna 110 by the tag A 210A. The reader 140 may determine that the item A 230A is located on the first platform, the wagon A 215A. At block 620 the reader 140 may communicate the location of the item A 230A, and any information describing the item A 230A, to the main server 240, the users 120A-N, and/or the crane 160.

At block 630 the system 100 may determine if the antenna 110 detects another item. If at block 630 another item is not detected by the antenna 110 the system 100 may move to block 670. At block 670 the system 100 may determine if the time limit has elapsed. The time limit may be the period of time the system 100 may continue to attempt to detect items 230A-N in the current shipment. Once the time limit elapses the system 100 may make the determination that all of the items 230A-N on the shipment passed the range of the antenna 110. The system 100 may determine the time limit based on the average size of the shipments, the lengths of the items 230A-N being transported, the velocity of the items 230A-N or generally any other variables that may effect the detection time intervals.

If at block 670 the system 100 determines that the time limit has elapsed, the system 100 may move to block 680. At block 680 the reader 140 may communicate to the main server 240, the users 120A-N, and/or the crane 160 that the entire shipment has passed the antenna 110. Alternatively or in addition the reader 140 may communicate that there are no more items to be detected on the last platform.

If at block 670 the system 100 determines that the time limit has not elapsed, the system 100 may return to block 630 and continue to wait for the antenna 110 to detect additional items. If at block 630 the antenna 110 detects another item, the antenna 110 may communicate the detection data of the currently detected item to the reader 140 and the system 100 may move to block 640. At block 640 the reader 140 may determine whether the antenna 110 still detects a previously detected item. If at block 640 the antenna 110 still detects a previously detected item then the previously detected item and the current detected item may be located on the same platform and the system may move to block 660. At block 660 the reader 140 may communicate to the main server 240, the users 120A-N, and/or the crane 160 that the current item is located on the same platform as the previous item. The system 100 may then return to block 630 and determine if the antenna 110 detects another item.

If at block 630 the antenna 110 no longer detects any other items then the current detected item may be located on the next platform and the system 100 may move to block 650. At block 650 the reader 140 may communicate to the main server 240, the users 120A-N, and/or the crane 160 that the current item is located on the next platform. The system 100 may then return to block 630 and determine if the antenna 110 detects another item.

Alternatively or in addition the reader 140 may compare the detection time period of the current detected item and the time period of the previous detected items on the current platform. The time period may be the time the item first passed within range of the antenna 110 until the time the item passed out of range of the antenna 110. If the detection time period of the current detected item overlaps the detection time period of the previous items on the current platform the current item may also be located upon the platform.

Figure 7:
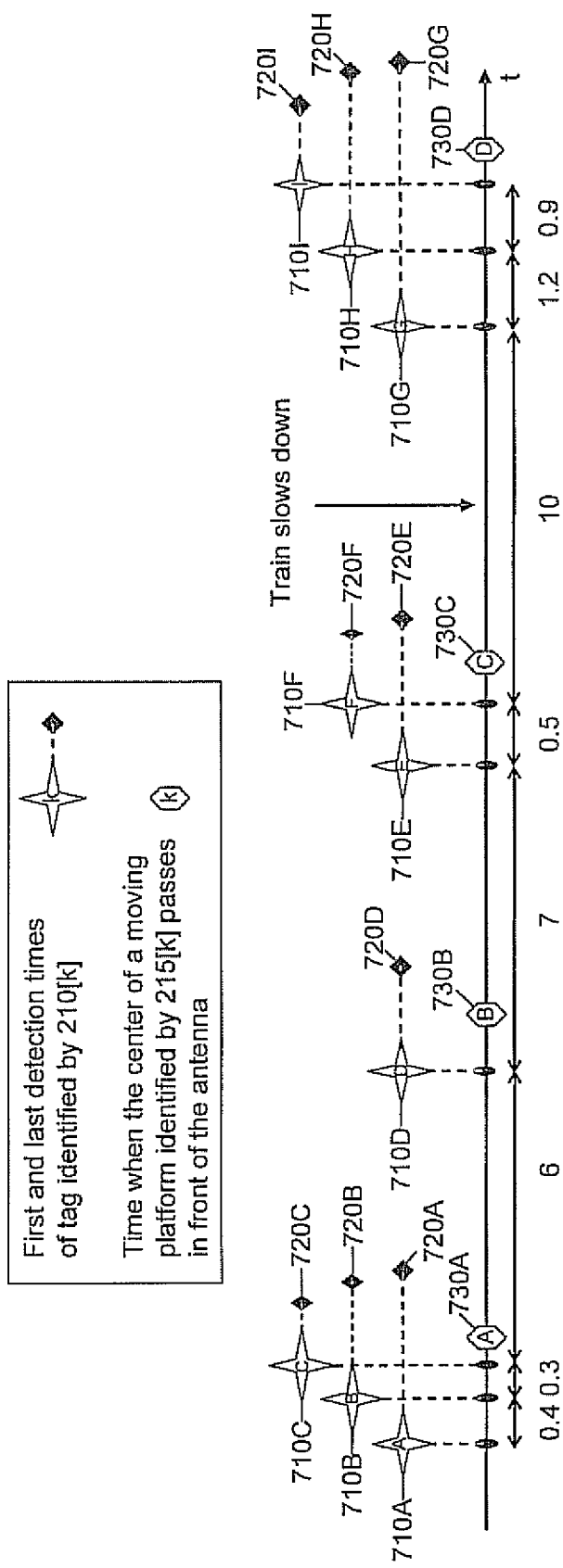
FIG. 7 is a graph illustrating the detection time intervals of a plurality of items in the system of FIG. 1 or other systems for determining a relative location of a plurality of items upon a plurality of platforms.

FIG. 7 illustrates a time graph 700 depicting exemplary detection time intervals of the items 230A-N passing by the antenna 110 in FIG. 2. The time graph 700 may include detection start times 710A-N, detection end times 720A-N, and platform center times 730A-N. The detection start times 710A-N may indicate the time the tags 210A-N of the items 230A-N first passed within range of the antenna 110. The detection end times 720A-N may represent the time the tags 210A-N of the items 230A-N passed out of range of the antenna 110. The detection time period of each of the items 230A-N may start at the detection start time 710A-N of the items 230A-N and may end at the detection end times 720A-N of the items 230A-N. The platform center times 730A-N may represent the time the center of the platforms 215A-N passed by the antenna 110. The time limit of the system 100, indicating that the shipment has passed, may be set at 15 seconds.

The detection start times 710A-N and the detection end times 720A-N may be used to demonstrate how the reader 140 may implement the time interval algorithm of FIG. 4, the average time interval algorithm of FIG. 5 and the overlapping time interval algorithm of FIG. 6 on a particular data set.

In the case of the time interval algorithm illustrated in FIG. 4, the system 100 may identify a time interval threshold, such as 1.5 seconds. At time t=0 the antenna 110 may detect the tag A 210A of the item A 230A at detection start time A 710A. The reader 140 may communicate that the item A 230A is on the first platform, the wagon A 215A. Approximately 0.4 seconds later the antenna 110 may detect the tag B 210B of item B 230B at detection start time B 710B. The reader 140 may calculate the time interval between the detection start time A 710A of the item A 230A and the detection start time B 710B of the item B 230B. In this instance the time interval may be 0.4 seconds, which is less than the time interval threshold of 1.5 seconds. Thus, the reader 140 may communicate that the item B 230B is located on the same platform as the item A 230A, the wagon A 215A.

Approximately 0.3 seconds later the antenna 110 may detect the tag C 210C of item C 230C at detection start time C 710C. The reader 140 may calculate the time interval between the detection start time B 710B of the item B 230B and the detection start time C 710C of the item C 230C. In this instance the time interval may be 0.3 seconds, which is less than the time interval threshold of 1.5 seconds. Thus, the reader 140 may communicate that the item C 230C is located on the same platform as the item B 230B, the wagon A 215A.

Approximately 6 seconds later the antenna 110 may detect the tag D 210D of item D 230D at detection start time D 710D. The reader 140 may calculate the time interval between the detection start time C 710C of the item C 230C and the detection start time D 710D of the item D 230D. In this instance the time interval may be 6 seconds, which is more than the time interval threshold of 1.5 seconds. Thus, the reader 140 may communicate that the item D 230D is located on the next platform, the wagon B 215B.

Approximately 7 seconds later the antenna 110 may detect the tag E 210E of item E 230E at detection start time E 710E. The reader 140 may calculate the time interval between the detection start time D 710D of the item D 230D and the detection start time E 710E of the item E 230E. In this instance the time interval may be 7 seconds, which is more than the time interval threshold of 1.5 seconds. Thus, the reader 140 may communicate that the item E 230E is located on the next platform, the wagon C 215C.

Approximately 0.5 seconds later the antenna 110 may detect the tag F 210F of item F 230F at detection start time F 710F. The reader 140 may calculate the time interval between the detection start time E 710E of the item E 230E and the detection start time F 710F of the item F 230F. In this instance the time interval may be 0.5 seconds, which is less than the time interval threshold of 1.5 seconds. Thus, the reader 140 may communicate that the item F 230F is located on the same platform as the item E 230E, the wagon C 215C.

Approximately 10 seconds later the antenna 110 may detect the tag G 210G of item G 230G at detection start time G 710G. The reader 140 may calculate the time interval between the detection start time F 710F of the item F 230F and the detection start time G 710G of the item G 230G. In this instance the time interval may be 10 seconds, which is more than the time interval threshold of 1.5 seconds. Thus, the reader 140 may communicate that the item G 230G is located on the next platform, the wagon D 215D.

Approximately 1.2 seconds later the antenna 110 may detect the tag H 210H of item H 230H at detection start time H 710H. The reader 140 may calculate the time interval between the detection start time G 710G of the item G 230G and the detection start time H 710H of the item H 230H. In this instance the time interval may be 1.2 seconds, which is less than the time interval threshold of 1.5 seconds. Thus, the reader 140 may communicate that the item H 230H is located on the same platform as the item G 230G, the wagon D 215D.

Approximately 0.9 seconds later the antenna 110 may detect the tag I 210I of item I 230I at detection start time I 710I. The reader 140 may calculate the time interval between the detection start time H 710H of the item H 230H and the detection start time I 710I of the item I 230I. In this instance the time interval may be 0.9 seconds, which is less than the time interval threshold of 1.5 seconds. Thus, the reader 140 may communicate that the item I 230I is located on the same platform as the item H 230H, the wagon D 215D.

After detecting the detection end time G 710G of the item G 710G the antenna 110 may not detect any additional items. Once the time limit of 15 seconds has elapsed the reader 140 may communicate that the entire shipment has passed the antenna 110 and that there are no more items on the wagon D 215D.

In the case of the average time interval algorithm illustrated in FIG. 5, the system 100 may identify an initial average time interval threshold for a wagon, such as 1.5 seconds and a constant, such as 5. The constant and the initial average time interval may be mathematically derived by creating a model that accurately maps historical detection times of items with the actual platform they were transported on. For example the system 100 may determine a constant and an initial average time interval that best fit the relative location determined by the system 100 to the actual relative location of an item in a shipment.

At time t=0 the antenna 110 may detect the tag A 210A of the item A 230A at detection start time A 710A. The reader 140 may communicate that the item A 230A is on the first platform, the wagon A 215A. Approximately 0.4 seconds later the antenna 110 may detect the tag B 210B of item B 230B at detection start time B 710B. The reader 140 may multiple the constant of 5 by the average time interval of 1.5 for a result of 7.5. In this case the time interval 0.4 is less than the result, 7.5, so the reader 140 may communicate that the item B 230B is located on the same platform as the item A 230A, the wagon A 215A. The reader 140 may then update the average time interval for the wagon A 215A. Since there is only one time interval, 0.4 seconds, the average time interval may be 0.4 seconds divided by 1, or 0.4 seconds.

Approximately 0.3 seconds later the antenna 110 may detect the tag C 210C of item C 230C at detection start time C 710C. The reader 140 may multiple the constant of 5 by the average time interval of 0.4 for a result of 2. In this case the time interval 0.3 is less than the result, 2, so the reader 140 may communicate that the item C 230C is located on the same platform as the item B 230B, the wagon A 215A. The reader 140 may then update the average time interval for the wagon A 215A. The average time interval may be the 0.4 second interval, plus the 0.3 second interval, the sum divided by the total number of intervals, 2. The reader 140 may calculate the updated time interval as 0.35 seconds.

Approximately 6 seconds later the antenna 110 may detect the tag D 210D of item D 230D at detection start time D 710D. The reader 140 may multiple the constant of 5 by the average time interval of 0.35 for a result of 1.75. In this case the time interval 6 is greater than the result, 1.75, so the reader 140 may communicate that the item D 230D is located on the next platform, the wagon B 215B. The reader 140 may not update the average time interval because the item D 230D is not located on the wagon A 215A. The current average time interval of 0.35 seconds may carry over to the calculations on items upon the wagon B 215B.

Approximately 7 seconds later the antenna 110 may detect the tag E 210E of item E 230E at detection start time E 710E. The reader 140 may multiple the constant of 5 by the average time interval of 0.35 for a result of 1.75. In this case the time interval 7 is greater than the result, 1.75, so the reader 140 may communicate that the item E 230E is located on the next platform, the wagon C 215C. The reader 140 may not update the average time interval because the item E 230E is not located on the wagon B 215B. The current average time interval of 0.35 seconds may carry over to the calculations on items upon the wagon C 215C.

Approximately 0.5 seconds later the antenna 110 may detect the tag F 210F of item F 230F at detection start time F 710F. The reader 140 may multiple the constant of 5 by the average time interval of 0.35 for a result of 1.75. In this case the time interval 0.5 is less than the result, 1.75, so the reader 140 may communicate that the item F 230F is located on the same platform as the item E 230E, the wagon C 215C. The reader 140 may then update the average time interval for the wagon C 215C. Since there is only one time interval, 0.5 seconds, the average time interval may be 0.5 seconds divided by 1, or 0.5 seconds.

Approximately 10 seconds later the antenna 110 may detect the tag G 210G of item G 230G at detection start time G 710G. The reader 140 may multiple the constant of 5 by the average time interval of 0.5 for a result of 2.5. In this case the time interval 10 is greater than the result, 2.5, so the reader 140 may communicate that the item G 230G is located on the next platform, the wagon D 215D. The reader 140 may not update the average time interval because the item G 230G is not located on the wagon C 215C. The current average time interval of 0.5 seconds may carry over to the calculations on items upon the wagon D 215D.

Approximately 1.2 seconds later the antenna 110 may detect the tag H 210H of item H 230H at detection start time H 710H. The reader 140 may multiple the constant of 5 by the average time interval of 0.5 for a result of 2. In this case the time interval 1.2 is less than the result, 2, so the reader 140 may communicate that the item H 230H is located on the same platform as the item G 230G, the wagon D 215D. The reader 140 may then update the average time interval for the wagon D 215D. Since there is only one time interval, 1.2 seconds, the average time interval may be 1.2 seconds divided by 1, or 1.2 seconds.

Approximately 0.9 seconds later the antenna 110 may detect the tag I 210I of item I 230I at detection start time I 710I. The reader 140 may multiple the constant of 5 by the average time interval of 1.2 for a result of 6. In this case the time interval 0.9 is less than the result, 6, so the reader 140 may communicate that the item I 230I is located on the same platform as the item H 230H, the wagon D 215D. The reader 140 may then update the average time interval for the wagon D 215D. The average time interval may be the 1.2 second interval, plus the 0.9 second interval, the sum divided by the total number of intervals, 2. The reader 140 may calculate the updated time interval as 1.05 seconds.

After detecting the detection end time G 710G of the item G 710G the antenna 110 may not detect any additional items. Once the time limit of 15 seconds has elapsed the reader 140 may communicate that the entire shipment has passed the antenna 110 and that there are no more items on the wagon D 215D.

In the case of the time overlap algorithm illustrated in FIG. 6, the system 100 may detect the relative location of the items 230A-N based on whether their detection time periods overlap. At time t=0 the antenna 110 may detect the tag A 210A of the item A 230A at detection start time A 710A. The reader 140 may communicate that the item A 230A is on the first platform, the wagon A 215A. Approximately 0.4 seconds later the antenna 110 may detect the tag B 210B of item B 230B at detection start time B 710B. The reader 140 may determine if the antenna 110 still detects the tags of the items on the current platform, the wagon A 215A. In this case the only item currently known to be on the wagon A 215A is the item A 230A. Since the detection stop time A 720A of the item A 230A has not yet passed, the antenna 110 may detect both the item A 230A and the item B 230B at the same time. Thus, the reader 140 may communicate that the item B 230B is located on the same platform as the item A 230A, the wagon A 215A.

Approximately 0.3 seconds later the antenna 110 may detect the tag C 210C of item C 230C at detection start time C 710C. The reader 140 may determine if the antenna 110 still detects the tags of the items on the current platform, the wagon A 215A. In this case the items currently known to be on the wagon A 215A are the items 230 A-B. Since the detection stop times 720A-B of the items 230A-B have not yet passed, the antenna 110 may detect the items 230A-C at the same time. Thus, the reader 140 may communicate that the item C 230C is located on the same platform as the items 230A-B, the wagon A 215A.

Approximately 6 seconds later the antenna 110 may detect the tag D 210D of item D 230D at detection start time D 710D. The reader 140 may determine if the antenna 110 still detects the tags of the items on the current platform, the wagon A 215A. In this case the items currently known to be on the wagon A 215A are the items 230 A-C. Since the detection stop times 720A-C of the items 230A-C have already passed, the antenna 110 may not detect the item D 230D at the same time as the items 230A-C. Thus, the reader 140 may communicate that the item D 230D is located upon the next platform, the wagon B 215B.

Approximately 7 seconds later the antenna 110 may detect the tag E 210E of item E 230E at detection start time E 710E. The reader 140 may determine if the antenna 110 still detects the tags of the items on the current platform, the wagon B 215B. In this case the only item known to be on the wagon B 215B is the item D 230D. Since the detection stop time D 720D of the item D 230D has already passed, the antenna 110 may not detect the item E 230E at the same time as the item D 230D. Thus, the reader 140 may communicate that the item E 230E is located upon the next platform, the wagon C 215C.

Approximately 0.5 seconds later the antenna 110 may detect the tag F 210F of item F 230F at detection start time F 710F. The reader 140 may determine if the antenna 110 still detects the tags of the items on the current platform, the wagon C 215C. In this case the only item currently known to be on the wagon C 215C is the item E 230E. Since the detection stop time E 720E of the item E 230E has not yet passed, the antenna 110 may detect both the item E 230E and the item F 230F at the same time. Thus, the reader 140 may communicate that the item F 230F is located on the same platform as the item E 230E, the wagon C 215C.

Approximately 10 seconds later the antenna 110 may detect the tag G 210G of item G 230G at detection start time G 710G. The reader 140 may determine if the antenna 110 still detects the tags of the items on the current platform, the wagon C 215C. In this case the items currently known to be on the wagon C 215C are the items 230E-F. Since the detection stop times 720E-F of the items 230E-F have already passed, the antenna 110 may not detect the item G 230G at the same time as the items 230E-F. Thus, the reader 140 may communicate that the item G 230G is located upon the next platform, the wagon D 215D.

Approximately 1.2 seconds later the antenna 110 may detect the tag H 210H of item H 230H at detection start time H 710H. The reader 140 may determine if the antenna 110 still detects the tags of the items on the current platform, the wagon D 215D. In this case the only item currently known to be on the wagon D 215CD is the item G 230G. Since the detection stop time G 720G of the item G 230G has not yet passed, the antenna 110 may detect both the item G 230G and the item H 230H at the same time. Thus, the reader 140 may communicate that the item H 230H is located on the same platform as the item G 230G, the wagon D 215D.

Approximately 0.9 seconds later the antenna 110 may detect the tag I 210I of item I 230I at detection start time I 710I. The reader 140 may determine if the antenna 110 still detects the tags of the items on the current platform, the wagon D 215D. In this case the items currently known to be on the wagon D 215D are the items 230 G-H. Since the detection stop times 720G-H of the items 230G-H have not yet passed, the antenna 110 may detect the items 230G-I at the same time. Thus, the reader 140 may communicate that the item I 230I is located on the same platform as the items 230G-H, the wagon D 215D.

After detecting the detection end time G 710G of the item G 710G the antenna 110 may not detect any additional items. Once the time limit of 15 seconds has elapsed the reader 140 may communicate that the entire shipment has passed the antenna 110 and that there are no more items on the wagon D 215D.

Figure 8:
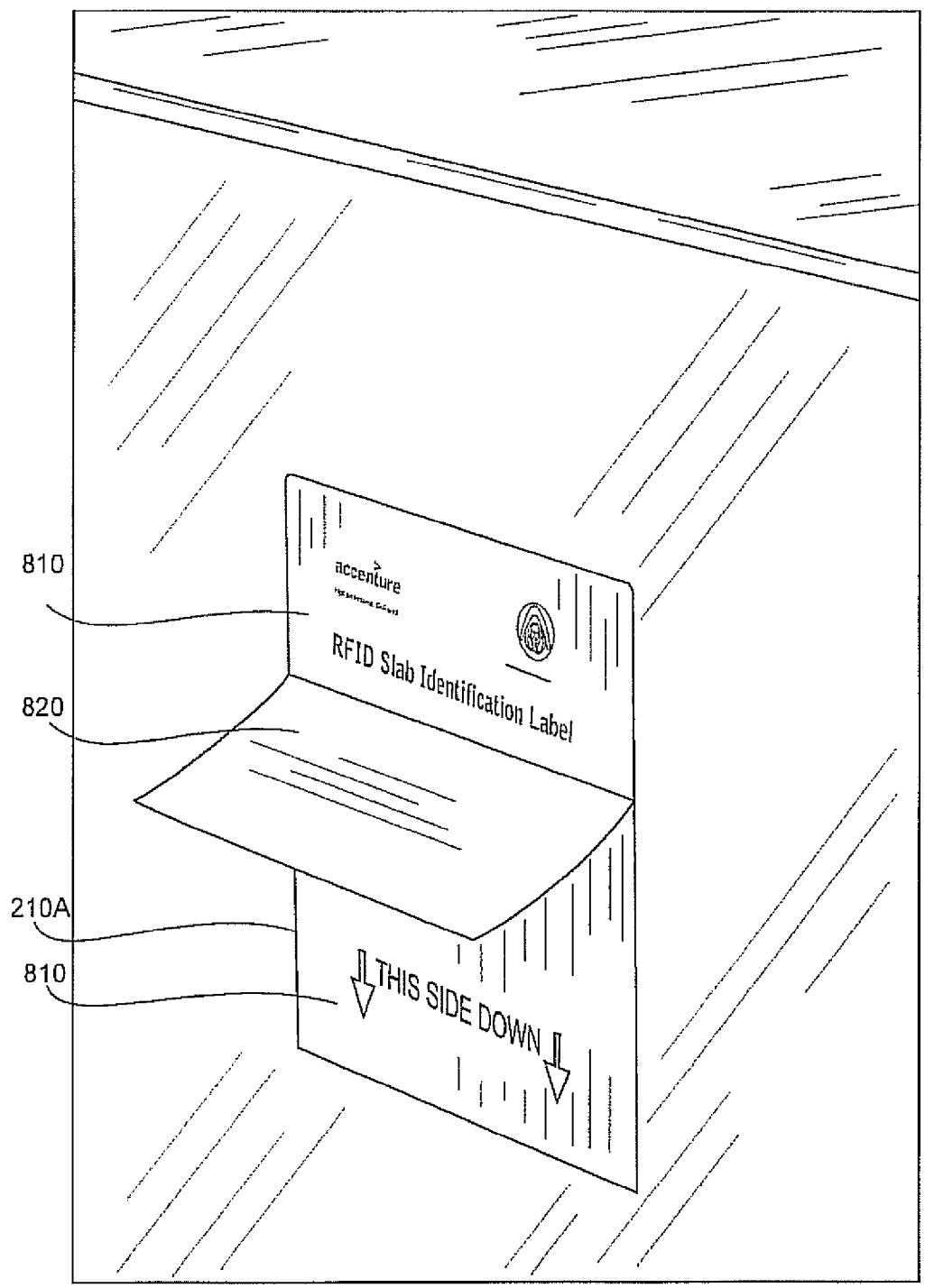
FIG. 8 is an illustration of a tag for detecting an item in the system of FIG. 1, or other systems for determining a relative location of a plurality of items upon a plurality of platforms.

FIG. 8 illustrates an exemplary tag for detecting an item in the system of FIG. 1, or other systems for determining a relative location of a plurality of items upon a plurality of platforms. The tag A 210A may be an RFID tag and may include a body 810 and a flap or flag portion 820. The flag 820 may stick out from the body 810 at about a 90 degree angle. In other implementations, other identification technology may be used, such as optical systems including barcodes. Due to various uncontrollable environmental factors and the need to identify the items 230A-N from a distance at various read points, barcodes may not be a viable option given current technology. By using the identification system, such as RFID tags, a company can achieve tight time requirements when unloading items 230A-N from sea vessels and river barges, as well as significant cost savings on new processes that else would have required additional manual labor. The RFID tags may be manufactured to endure harsh environmental conditions and mechanical stress, and may allow items 230A-N, such as steel slabs to be identified by RFID antennas 110 on loading cranes.

Figure 9:
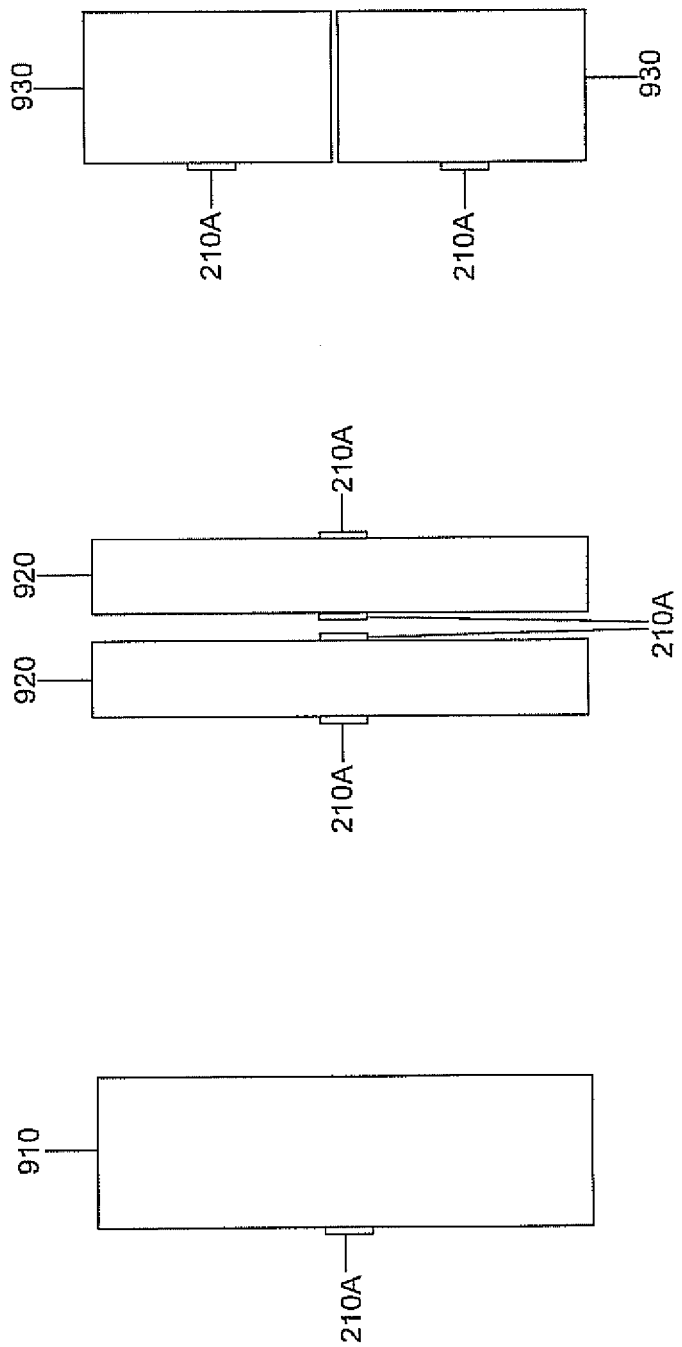
FIG. 9 is an illustration of how tags may be positioned on items in the system of FIG. 1 or other systems for determining a relative location of a plurality of items upon a plurality of platforms.

FIG. 9 illustrates how tags may be positioned on items in the system of FIG. 1 or other systems for determining a relative location of a plurality of items upon a plurality of platforms. In FIG. 9 the items 230A-N may be various forms of steel slabs. For a full slab 910, only one tag A 210A may be needed. The tag A 210A may be positioned in the middle of a long side of the slab 200. Position of the tag 200 may be implementation dependent and may vary depending on the implementation. For a slab 920 cut in length, two tags A 210A may be used on each side of the slabs, to help ensure that a tag in always oriented to an outside of the slab 920. The slabs cut in length 920 may represent one slab, so the tags A 210A on each slab 920 may convey the same data to the antenna 110. Alternatively or in addition each slab cut in length 920, or each side of each slab cut in length 920 may have its own distinct tag A 210A. In this case, there may be a tag A 210A for one half of the slab and a tag B 210B for the other half of the slab. The tags 210A-B may identify the half slabs 920 individually.

For a slab 930 cut in width, one tag A 210A may be used for each section of the cut slab 930. The tags A 210A may include specific information to indicate that the cut slab is only half as long as a regular slab. This may help determine the relative location of the slabs 930 on the wagons 215A-N. The slabs cut in width 930 may represent one slab, so the tags A 210A on each slab 930 may convey the same data to the antenna 110. Alternatively or in addition each slab cut in width 930, or each side of each slab cut in width 930 may have its own distinct tag A 210A. In this case, there may be a tag A 210A for one half of the slab and a tag B 210B for the other half of the slab. The tags 210A-B may identify the half slabs 920 individually and may provide more precise information on the relative location of the slabs 930. The tags 210A-N may be read when the items 230A-N arrive at a port or destination.

FIG. 10 illustrates an exemplary reader and antenna construction dimensions for use in the system of FIG. 1 or other systems for determining a relative location of a plurality of items upon a plurality of platforms. Not all of the depicted components may be required, however, and some implementations may include additional components. Variations in the arrangement and type of the components may be made without departing from the spirit or scope of the claims as set forth herein. Additional, different or fewer components may be provided.

Figure 11:
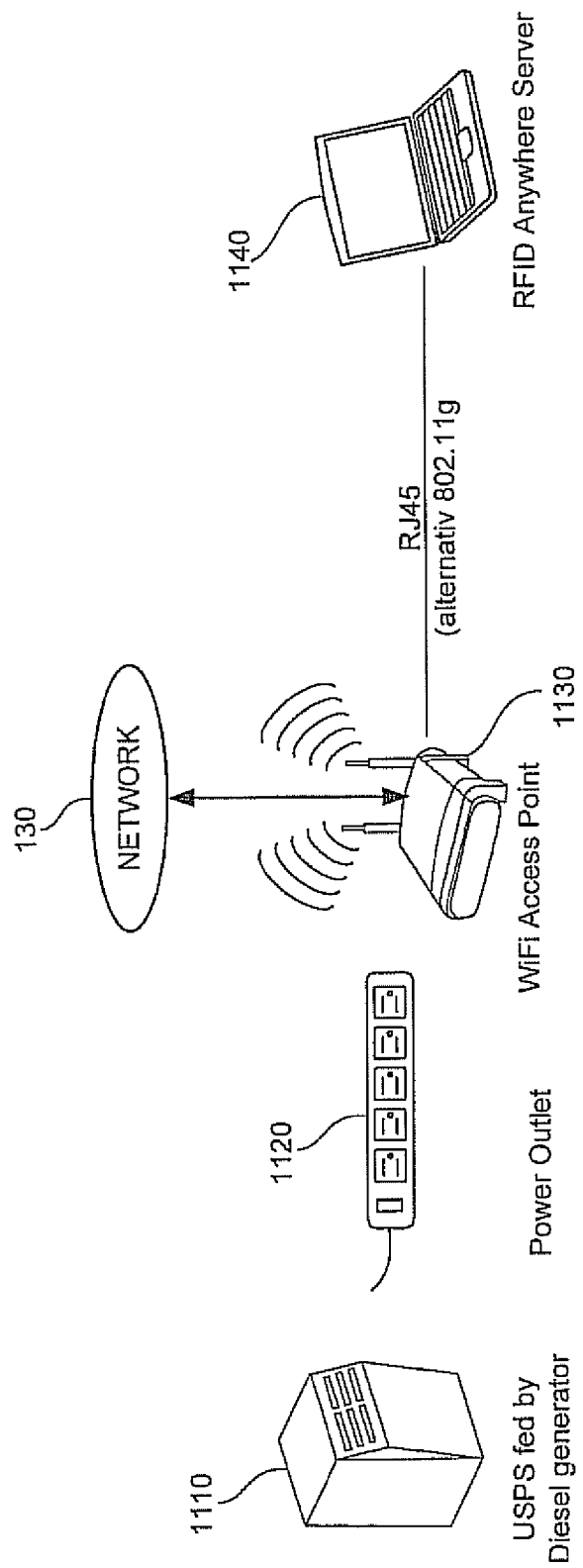
FIG. 11 is a block diagram of a remote entry system for use with the system of FIG. 1 or other systems for determining a relative location of a plurality of items upon a plurality of platforms.

FIG. 11 provides a view of a remote entry system for use with the system of FIG. 1 or other systems for determining a relative location of a plurality of items upon a plurality of platforms. Not all of the depicted components may be required, however, and some implementations may include additional components. Variations in the arrangement and type of the components may be made without departing from the spirit or scope of the claims as set forth herein. Additional, different or fewer components may be provided.

The automatic or manual process may occur remotely, such as using a power generator 1110 with a power outlet 1120 to power a processor such as a laptop computer 1140, which connect to a network 130, such as via a network access point 1130, which may include a router. The laptop computer 1140 may be used by one of the users 120A-N to receive information from the reader 140, the antenna 110, or the main server 240. Alternatively or in addition one of the users 120A-N may use the laptop computer 1140 to control the crane 160 based on information received from the reader 140 or the antenna 110.

Figure 12:
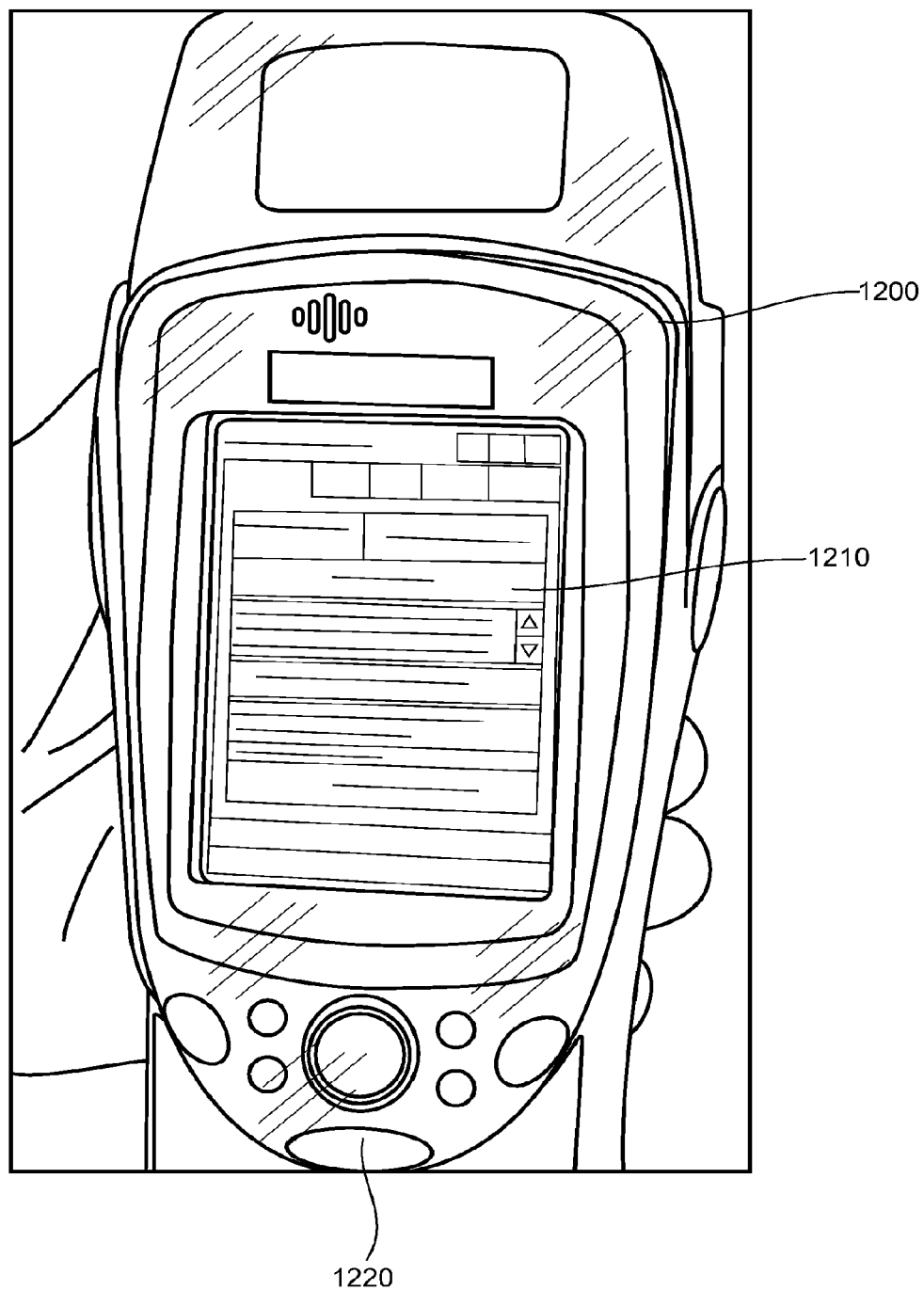
FIG. 12 is an illustration of an exemplary handheld reader in the system of FIG. 1 or other systems for determining a relative location of a plurality of items upon a plurality of platforms.

FIG. 12 illustrates an exemplary handheld reader in the system of FIG. 1 or other systems for determining a relative location of a plurality of items upon a plurality of platforms. The reader 1200 may be a handheld or stationary mounted device. In the case of RFID tags the reader 1200 may be an RFID reader. The reader 1200 may include a display screen 1210 and inputs 1220. The reader 1200 may be capable of reading data over long distances without the need for visual or physical contact. The reader 1200 may transfer received information to main server 240 for processing.

Figure 13:
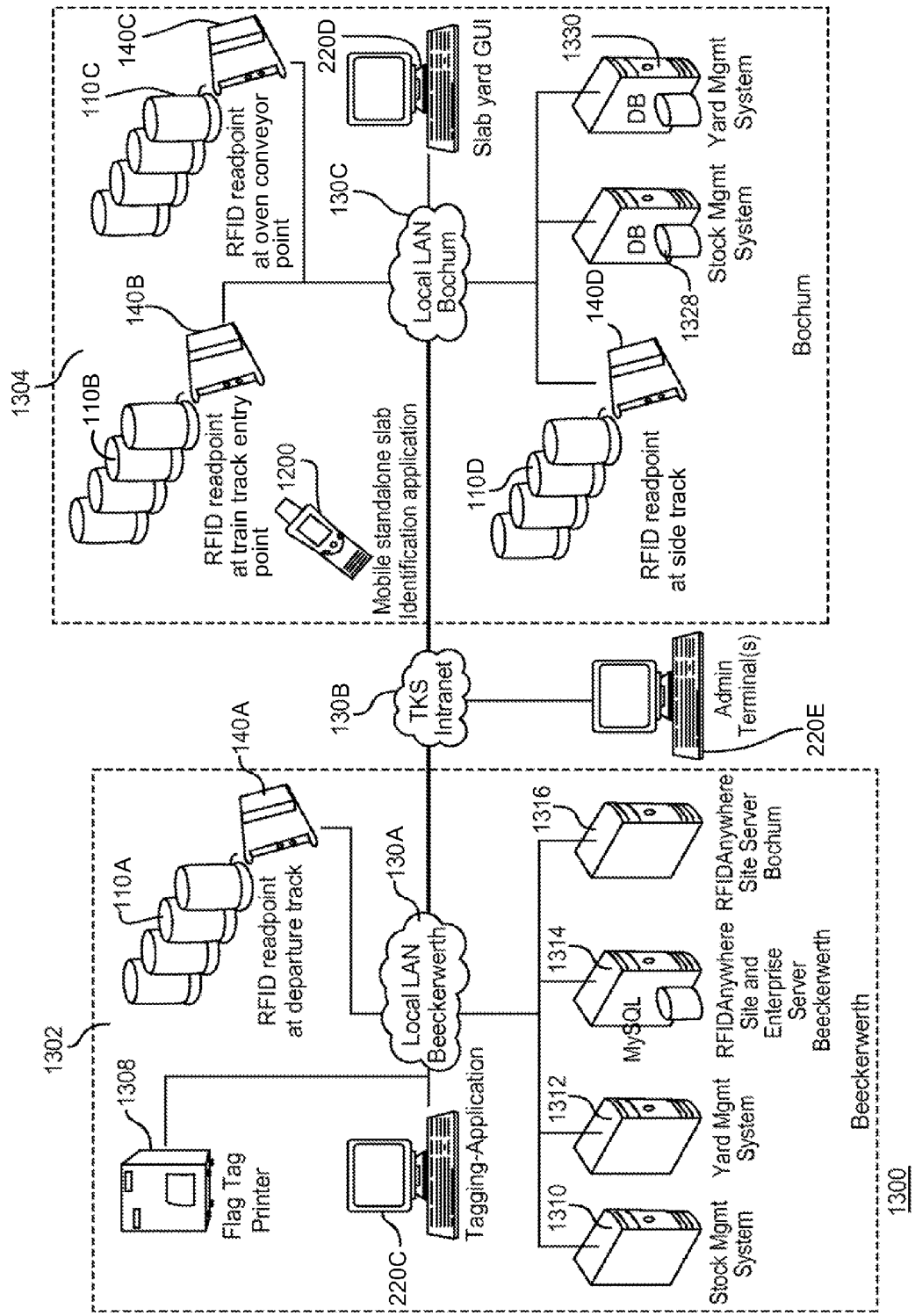
FIG. 13 is a block diagram of an exemplary computer environment for handling data related to the relative location of a plurality of items in the system of FIG. 1 or other systems for determining a relative location of a plurality of items upon a plurality of platforms.

FIG. 13 provides a view of an exemplary computer environment for handling data related to the relative location of a plurality of items in the system of FIG. 1 or other systems for determining a relative location of a plurality of items upon a plurality of platforms. Not all of the depicted components may be required, however, and some implementations may include additional components. Variations in the arrangement and type of the components may be made without departing from the spirit or scope of the claims as set forth herein. Additional, different or fewer components may be provided.

Information may be stored at a first location 1302 and a second location 1304, such as source location and a destination location in a supply chain. The first location 1302 may include devices such as a tagging application 220C, a tag printer 1308, and RFID antennas 110A, such as located at a departure point of the items 230A-N, which may include a train departure track 250. The first location 1302 may include a stock management system 1310, a yard management system 1312, a first location site enterprise server 1314, and a second location site server 1316. The devices may be connected via a network 130A, such as a local area network (LAN). The antennas 110A may connect to the network 130A via a reader 140A.

The second location 1304 may include devices such as antennas 1108 at a train track entry point, antennas 110C at an oven conveyer point, a handheld reader 1200, a side track antenna 110D, a stock management system 1328 and a yard management system 1330, including databases 245, and a slab yard graphical user interface (GUI) application 220D, which may include a graphic user interface (GUI). The devices may connect via a network 130C. The antennas 110B-D may connect to the network 130C via readers 140B-D. Alternatively or in addition the antennas 110B-D may connect directly to the network 130C. An administration processor 220E may access information from the locations 1302, 1304 via a network 130B, such as the Internet or intranet.

An RFID system may include a radio tag known as a transponder, a reader with antennae, and interfaces to IT systems, such as a main server 240. A microchip may be used to store an identifier, such as a ten-digit number code, which can be used to unambiguously identify every item 230A-N produced by a given company. The microchip and an antenna unit may be integrated in a plastic label known as the RFID tag. These tags 210A-N may be encoded and attached to the center of the items 230A-N sides. In other implementations, the tags 210A-N are placed elsewhere, such as on the end of the items 230A-N. The items 230A-N may subsequently be identified by an RFID antenna 110, which emits a high-frequency electromagnetic wave. The frequency may be set to meet local regulation all around the world. The energy from the radio wave excites the antenna coil in the tags 210A-N and generates an induced current. The current activates the microchip which then sends its information back to the antenna 110. The data are transferred from the antenna 110 to the central IT systems, such as the main server 240, where information is stored on the steel grade, dimensions, customer and destination of each of the items 230A-N, such as steel slabs. The items 230A-N may be identified several times en route to its destination, such as the rolling mills.

Figure 14:
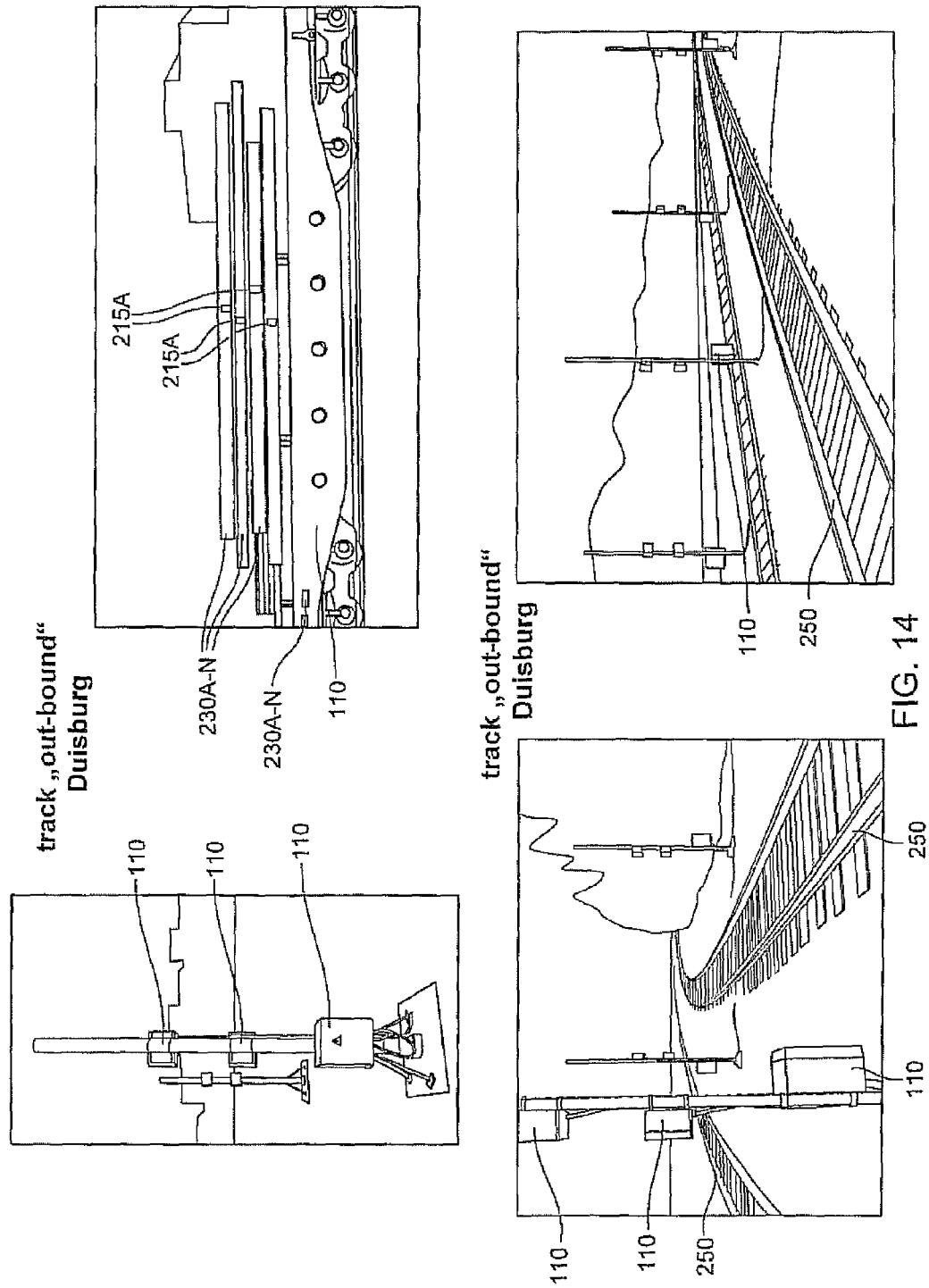
FIG. 14 is an illustration of antennas located by in-bound and outbound tracks in the system of FIG. 1 or other systems for determining a relative location of a plurality of items upon a plurality of platforms.

FIG. 14 illustrates antennas located by in-bound and out-bound tracks in the system of FIG. 1 or other systems for determining a relative location of a plurality of items upon a plurality of platforms. The antennas 110 may be RFID devices used to allow identification of the items 230A-N, such as steel slabs. An automatic arrival notice and validation that all of the items 230A-N arrived may be provided upon reading in all the items 230A-N. Automatic deduction of the wagon sequence from the sequence of the items 230A-N may allow human labor and errors to be reduced. The wagons 215A-N may travel on the tracks 250, such as railroad tracks.

FIG. 15 illustrates antennas located by rollers that transport items in the system of FIG. 1 or other systems for determining a relative location of a plurality of items upon a plurality of platforms. FIG. 15 illustrates antennas 110 located by rollers 250 that transport the items 230A-N, such as steel slabs, to the ovens for a re-heating process of the slabs. The data from the read tagged items 230A-N may be saved for future use and reporting purposes. As in any of the above steps, the items 230A-N may also be visually verified. An automatic plausibility check may be performed on the end-to-end RFID-process, such as by comparing the dimensions of the items 230A-N as reported by laser-based measuring systems with the item 230A-N dimensions obtained from the RFID identification system. Periodic plausibility checks may be performed by counting the number of items 230A-N between two RFID-equipped items 230A-N against the number of items 230A-N as written in the plans.

Figure 16:
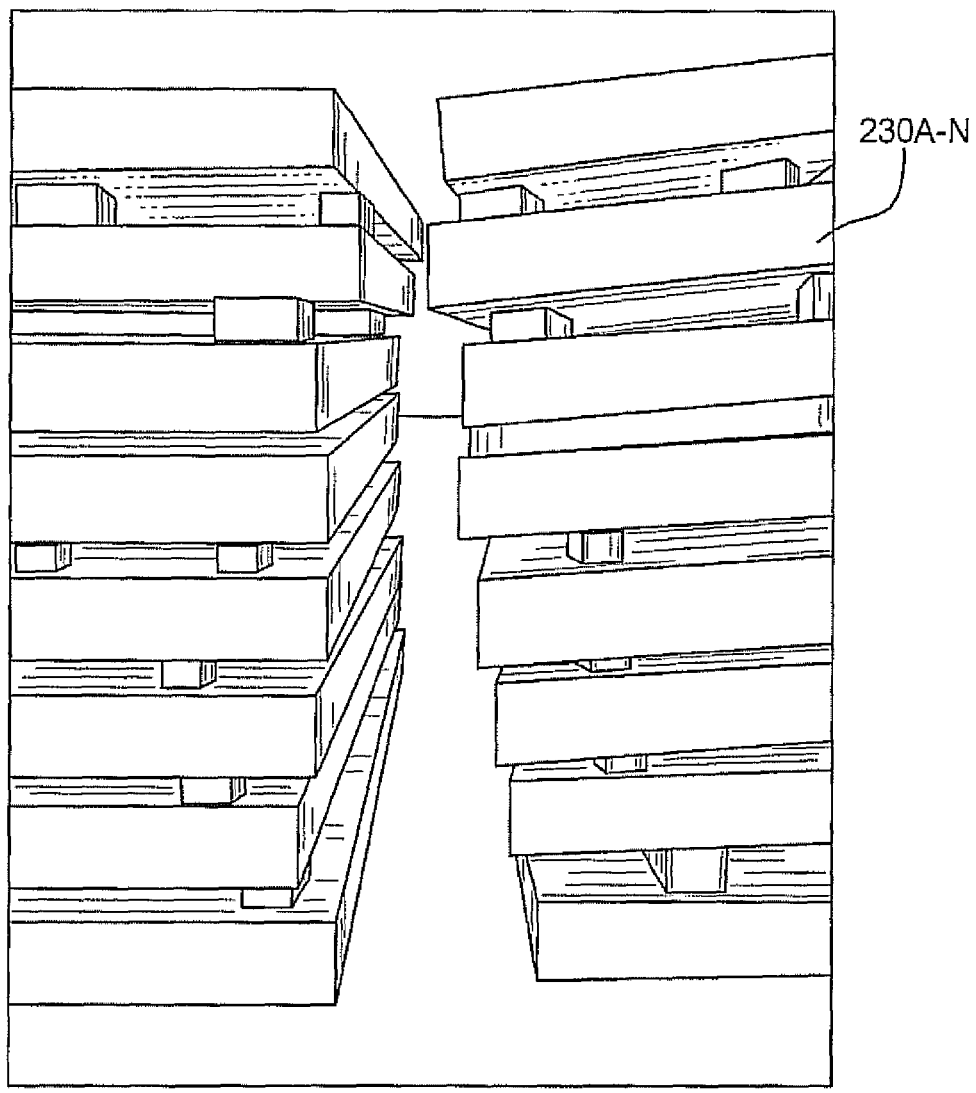
FIG. 16 is an illustration of stacked exemplary slabs.

FIG. 16 illustrates stacked exemplary items 230A-N, such as slabs. The items 230A-N may vary in sizes, such as 12 meters by 3 meters by 25 centimeters, and weigh about 30 tons. The identification system may be used in other implementations, however, such as for tracking other materials, or in other contexts, such as tracking files in a business. Some steel companies may deliver upwards of hundreds of thousands of steel slabs a year to be processed at plants from North America to Europe to Asia. The company may require secure, automated identification at key points along the route to expedite unloading times and prevent product mix-ups. The identification system may use radio frequency identification (RFID) technology in production to identify slabs of steel according to grade, dimensions, customer and destination.

Figure 17:
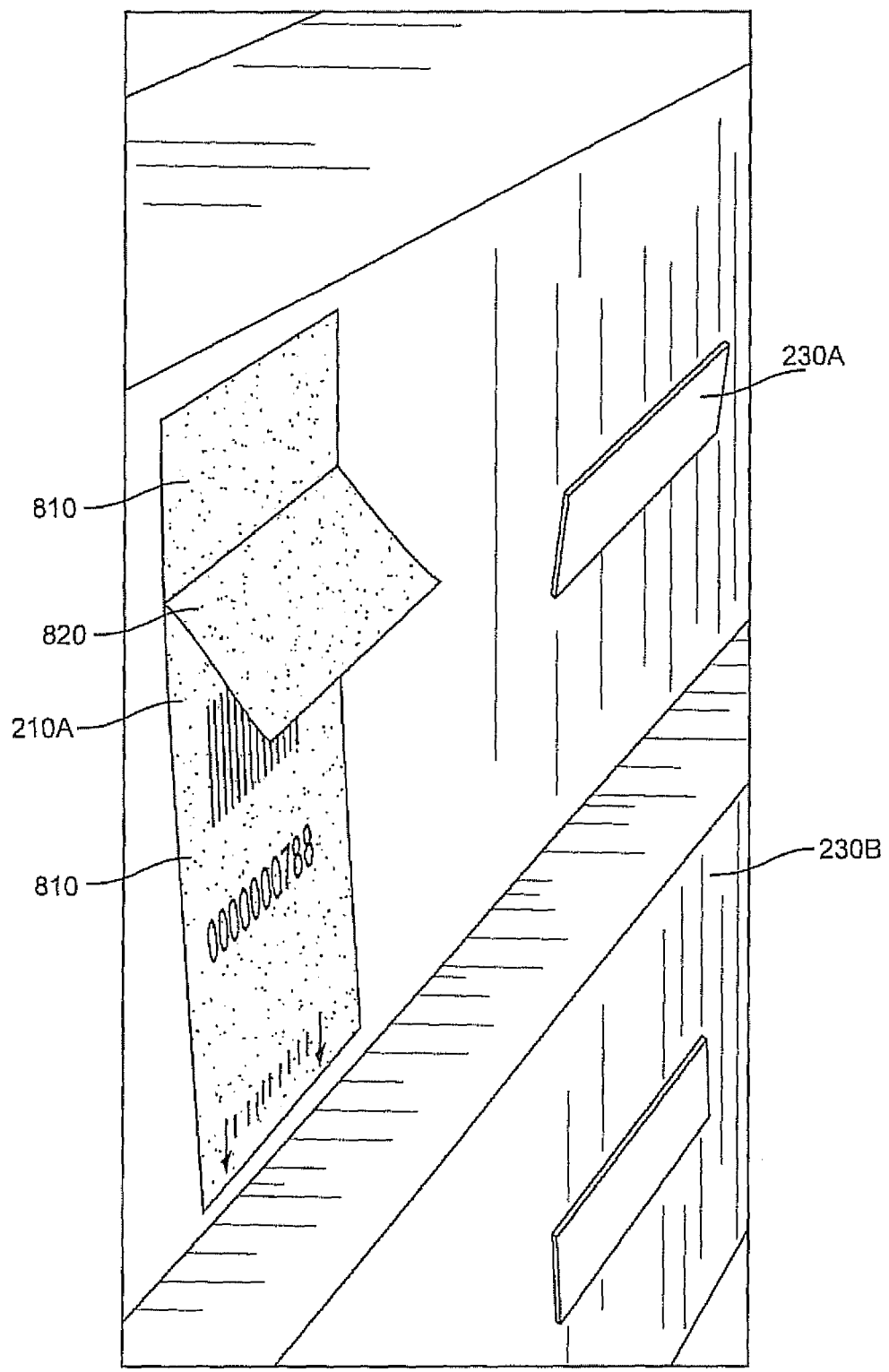
FIG. 17 is an illustration of a tag after being exposed to environmental conditions.

FIG. 17 illustrates a tag after being exposed to environmental conditions. The system 100 can track every single slab of steel produced in a steel mill, thus significantly improving shipment operations. Relying on manual verification of every single steel slab may be considered too time intensive, costly and prone to error. Anything but a secure automatic identification may leave crane capacities unused and endanger the company's ability to ship the produced volumes to their destination sites.

The RFID technology may be implemented to work effectively with metallic objects, since electromagnetic waves may be reflected from the metallic surfaces. The tags 210A-N or a folded paper label may be used that stands off from the surface like a small flag. A tag A 210A may include a crease so that the embedded RFID transponder does not lay flat against the object to which the paper label is attached. The RFID transponder may be located in a flap at a 90-degree angle to the object, extending like a flag perpendicular to the object. With the tag A 210A not touching the object, such as a metallic object, its readability may be improved. The RFID tag label's flag size, paper, glue, and the printer's folding mechanism may be used such that the labels could be folded without the need to perforate them. The lack of perforations may increases the flag's flexibility so that it bounces back to a 90-degree angle even if it has been laid flat for a considerable time during transport. A length of the flap part of the flag that protrudes from the items 230A-N may be between about 2 cm to 6 cm, and more preferably 4 cm.

An RFID-printer/encoder can automatically fold the tag labels. An exemplary label application device is manufactured by SATO Corporation located in Tokyo, Japan, and is described in U.S. patent application Pub. No. 2006/0226214, which is incorporated by reference herein. The tag A 210A may be manufactured of materials that withstand the harsh conditions encountered. The tags 210A=N may be made of materials that are harmless to the environment, such as when incinerated. A glue may be used that adheres the flag to a metal surface of the slab. Other tags may be used, such as on-metal tags that are applied directly to the slab.

Figure 18:
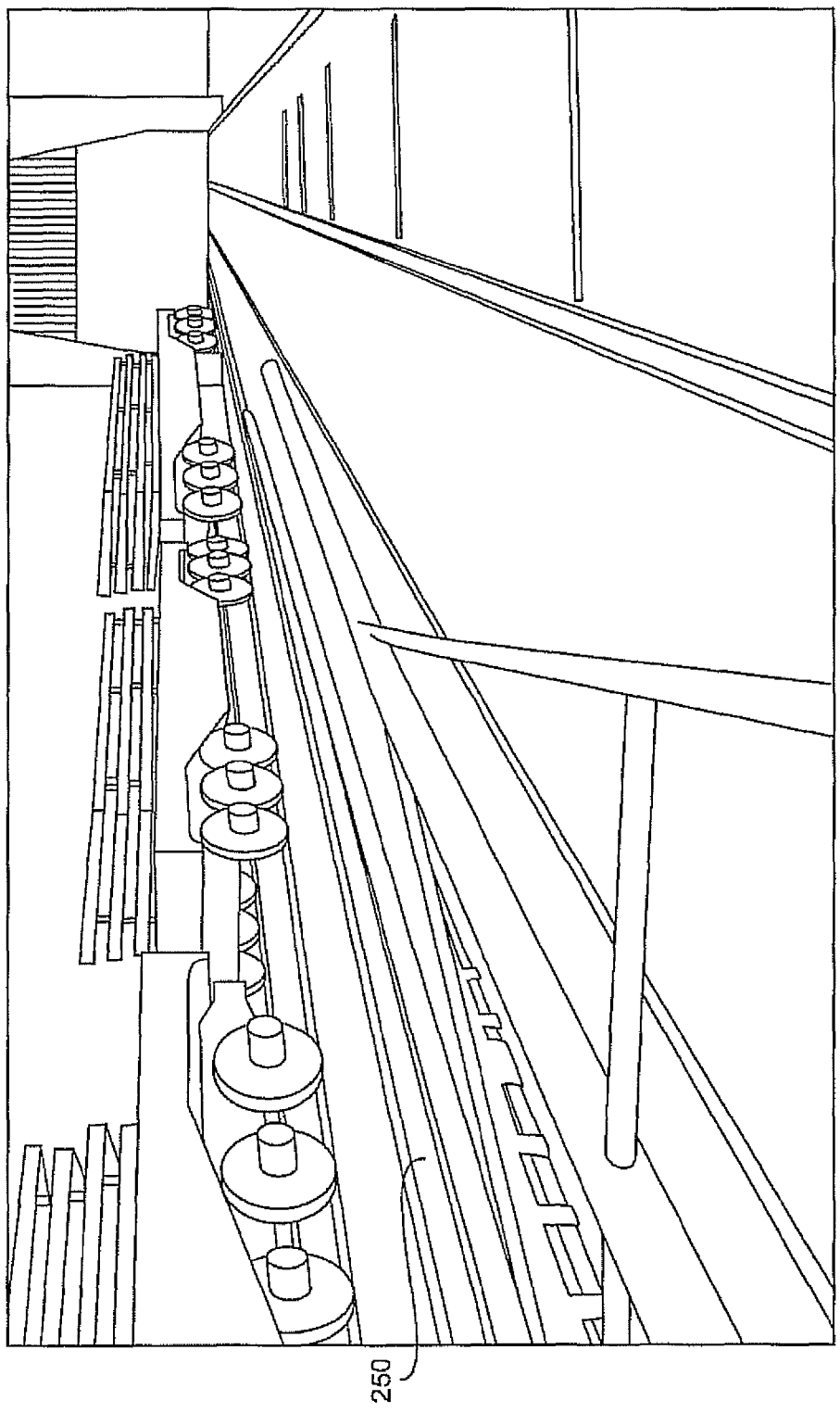
FIG. 18 is an illustration of slabs loaded onto train wagons in the system of FIG. 1 or other systems for determining a relative location of a plurality of items upon a plurality of platforms.

FIG. 18 illustrates slabs loaded onto train wagons in the system of FIG. 1 or other systems for determining a relative location of a plurality of items upon a plurality of platforms. The RFID tagged slabs may be read on the way out of the slab manufacturing plant, such as by being read on the cargo-train as the train departs past a scanner. The train may run on tracks 250, such as railroad tracks. The slabs may be transported to their destination over land, or loaded on to vessels if part of the shipment occurs over water.

Figure 19:
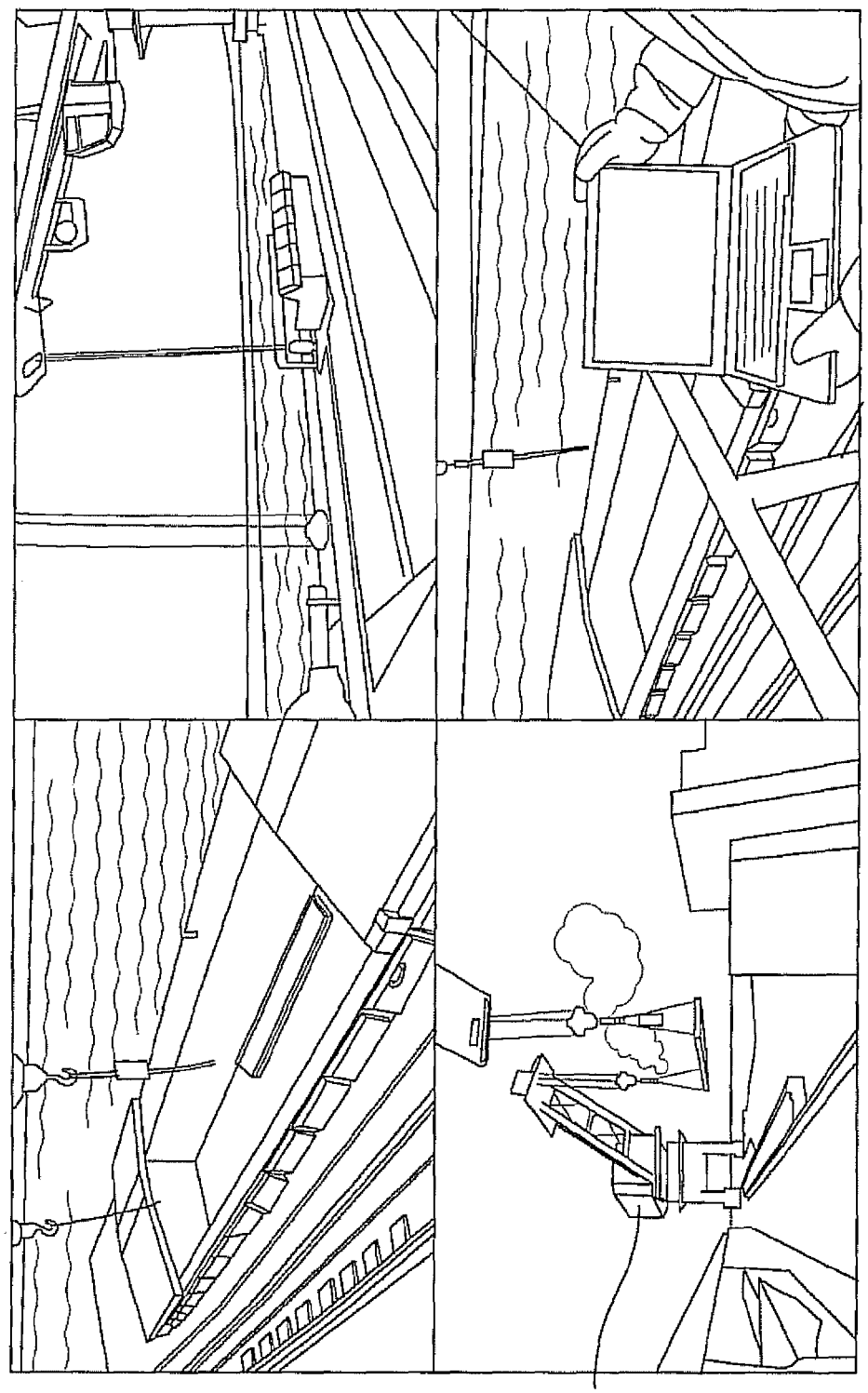
FIG. 19 is illustration of slabs being unloaded from a water shipping vessel in the system of FIG. 1 or other systems for determining a relative location of a plurality of items upon a plurality of platforms.

FIG. 19 illustrates slabs being loaded on to a water shipping vessel in the system of FIG. 1 or other systems for determining a relative location of a plurality of items upon a plurality of platforms. In other implementations, the slabs or other items 230A-N being tracked may be loaded on to air vessels. The crane 260 may be used to load and unload the slabs. The crane 260 may receive information from the antenna 110 indicating which items 230A-N may be upon which wagons 215A-N.

Figure 20:
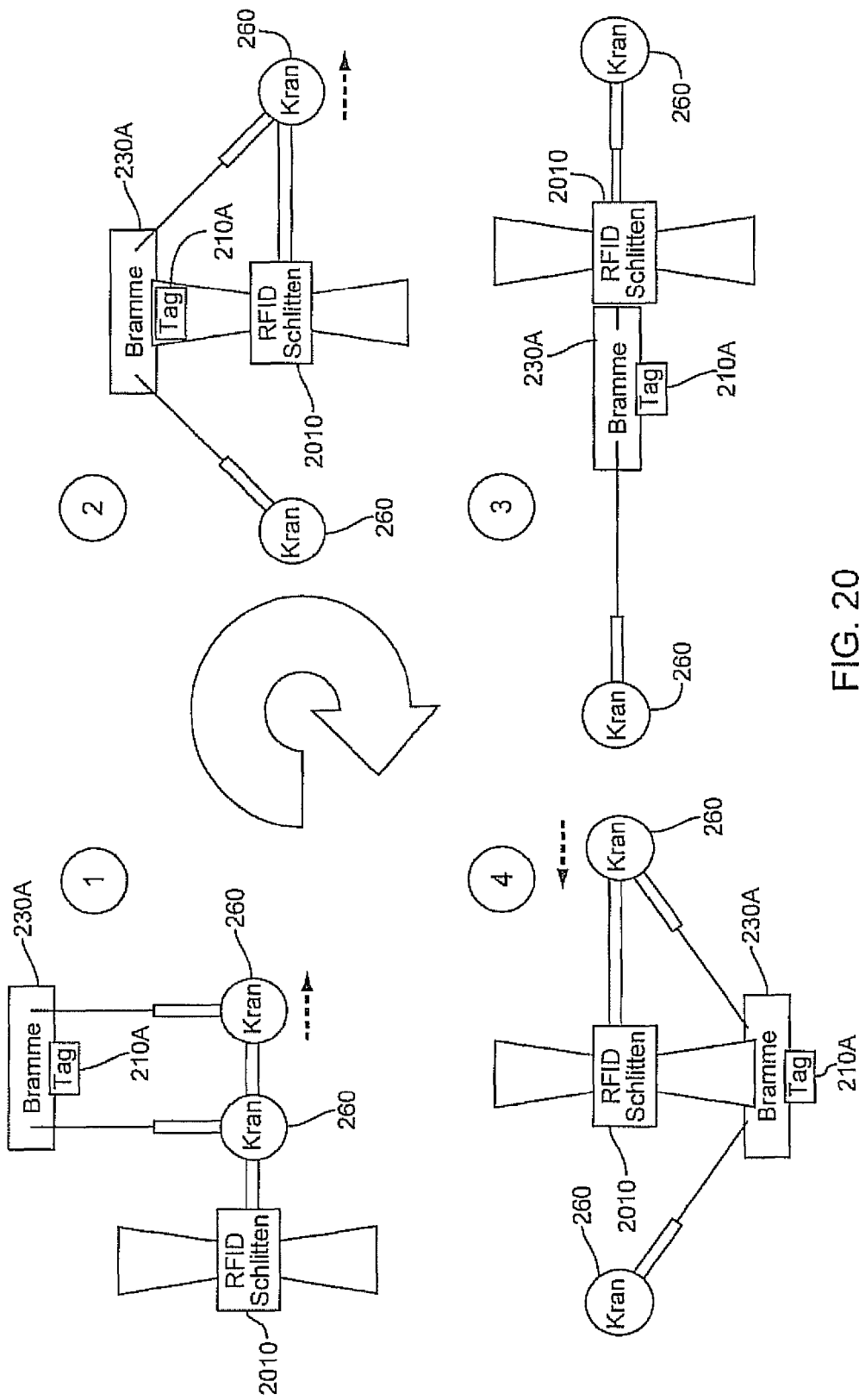
FIG. 20 is a block diagram demonstrating a way to read tags while items are being suspended by chains attached to cranes in the system of FIG. 1 or other systems for determining a relative location of a plurality of items upon a plurality of platforms.

FIG. 20 provides a view of a way to read tags while items are being suspended by chains attached to cranes in the system of FIG. 1 or other systems for determining a relative location of a plurality of items upon a plurality of platforms. Not all of the depicted components may be required, however, and some implementations may include additional components. Variations in the arrangement and type of the components may be made without departing from the spirit or scope of the claims as set forth herein. Additional, different or fewer components may be provided.

The tags 210A-N may be read by a RFID reader trailer 2010. Steps 1 through 4 shows how the tags 210A-N of the items 230A-N, such as slabs, may be positioned with the cranes 160 in front of an antenna of the reader trailer 2010. The reader trailer 2010 may include two antennas, such as on separate sides of the reader trailer 2010, to allow reading of the tags A 210A on either side of the item A 230A.

Figure 21:
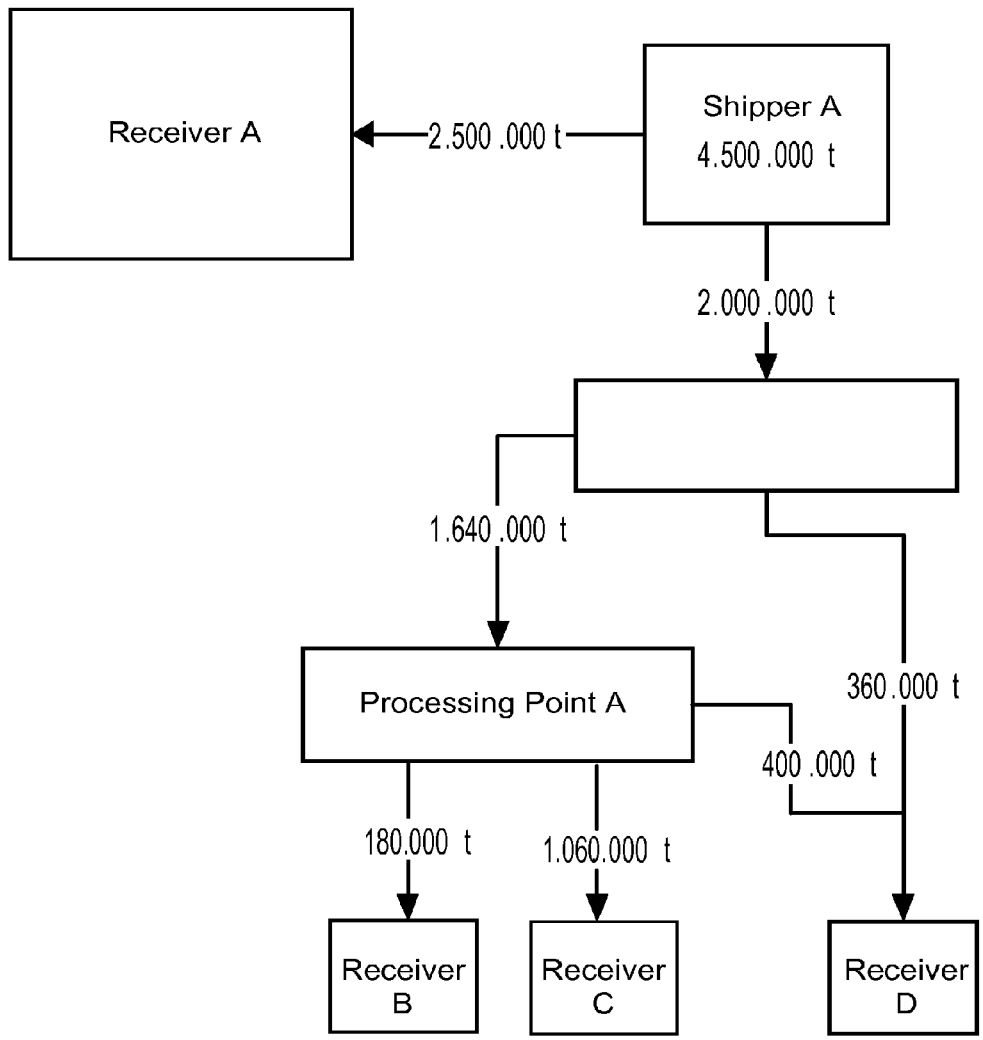
FIG. 21 is block diagram illustrating slabs being shipped to different locations in the system of FIG. 1 or other systems for determining a relative location of a plurality of items upon a plurality of platforms.

FIG. 21 illustrates slabs being shipped to different locations in the system of FIG. 1 or other systems for determining a relative location of a plurality of items upon a plurality of platforms. For example, 4,500,000 slabs may be shipped from Shipper A. 2,500,000 may be sent to Receiver A and the rest may be sent to Port A. Out of the 2,000,000 slabs sent to Port A, 1,640,000 may be sent to a processing point, such as Processing Point A, and the rest may be sent directly to Receiver D. From Processing Point A, 180,000 may be sent to Receiver B, 1,060,000 may be sent to Receiver C and 400,000 may be sent to Receiver D.

RFID may be used to help handle the tracking processes automatically, reliably and above all quickly between all of the sources and destinations. For example, at Port A, such as a European sea port where the freighters arrive with the steel intended for Germany, less than three minutes per slab may be available for unloading, allocation and reloading on barges or railcars. Part of the steel may be transported by rail directly to the company's hot rolling mill, while the other slabs may make their way up the Rhine by barge to a plant harbor. Again, the amount of time available for each loading operation may be very short, only two or three minutes.

In one example, a company set out to use RFID technology to automate the slab identification process. The company embarked on a six-month pilot project aimed at determining if RFID technology could work. The company equipped more than 1000 steel slabs with two tags A 210A each, and shipped the slabs from Brazil via Antwerp to Duisburg, Germany. At every location, the slabs were tested for correct functioning and the company gathered insights on the types of damages and malfunctions that might occur in transport. As part of the process, the solution endured performance tests aimed at determining the impact of strong magnets (such as in cranes and forklifts), resistance to such harsh environmental conditions as seawater, shock, temperature extremes, sea water, ice and dust, as well as bumps and knocks during transit. In every instance, RFID technology proved to be the first choice for slab logistics. The RFID system may have a range, such as up to ten meters. Optical image recognition systems, on the other hand, may have drawbacks, for example, among other things, their efficiency may be impaired by dirt, scale or ice on the slabs.

The tagging of slabs in Brazil were conducted using mobile RFID terminals by Psion Teklogix running a custom application based on Sybase' RFIDAnywhere middleware. As a way of comparing technologies, barcodes were also tested. When the slabs arrived in Antwerp, they were checked to determine if the barcode and RFID tags 210A-N were still readable. If they weren't, a reason was recorded for later analysis. When the slabs arrived at their ultimate destination in Duisburg, they were tested to see if the RFID-tags 210A-N would be readable from the rotating crane unloading them. In Duisburg, a custom movable RFID trailer 2010 was constructed, which was equipped with Alien Technology fixed RFID antennas 110. The slabs were lifted from the vessels with chains and moved over the RFID trailer 2010, which had two antenna bays that allowed it to read the RFID tags 210A-N from either side of the slab. These conditions were significantly more difficult than in ordinary deployment, yet the system was able to identify the majority of the slabs. With a range of up to ten meters, RFID technology proved better than barcodes. Barcodes required scanners to be positioned manually and much closer to the labels to function reliably, and only if the optical data carrier was in good shape.

The slabs were identified several times during the route to the German production mills. RFID read points along the entire supply chain were integrated with multiple production and inventory keeping applications. In the pilot, RFID handled the identification processes reliably and quickly. When the steel arrives on freighters, less than three minutes per slab may be available for unloading, allocation and reloading on barges or railcars. Taking advantage of RFID's range the system can identify the slabs while they were still suspended from the cranes 160 at a height of around three meters. In just a few milliseconds, a crane operator receives information regarding where to unload the slab. At its final destination, when the slab is about to enter the hot strip mill furnaces, RFID antennas 110 may ensure the right slabs are being processed. The company can also integrate the internal supply chain processes between two of its facilities. Multiple applications may be integrated to automate departure control, receiving of shipments, and control at the oven conveyor. It may include daily RFID tagging of all new stock produced for the company's production facility.

The following process may be used with the identification system. Tagging may be accomplished manually and/or automatically in one or more steps, such as at the slab production/manufacturing plant. All slabs in the yard may be initially tagged in a one-off effort. Thereafter, all new slabs may be tagged on a periodic basis, such as a daily basis after they arrive in the storage area, and are sufficiently cooled. This process may ensure that all slabs being shipped are equipped with functioning RFID tags carrying the slab ID. The loading and shipping process may be fully automated, such as if forklifts were RFID antenna 110 equipped. The aforementioned example referenced slabs, however, the example may apply to any items 230A-N.

FIG. 22 illustrates a general computer system 2200, which may represent a main server 240, a reader 140, or any of the other computing devices referenced herein. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The computer system 2200 may include a set of instructions 2224 that may be executed to cause the computer system 2200 to perform any one or more of the methods or computer based functions disclosed herein. The computer system 2200 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 2200 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 2224 (sequential or otherwise) that specify actions to be taken by that machine. In a particular embodiment, the computer system 2200 may be implemented using electronic devices that provide voice, video or data communication. Further, while a single computer system 2200 may be illustrated, the term "system" shall also be taken to include any collection of systems or subsystems that individually or jointly execute a set, or multiple sets, of instructions to perform one or more computer functions.

As illustrated in FIG. 22, the computer system 2200 may include a processor 2202, such as, a central processing unit (CPU), a graphics processing unit (GPU), or both. The processor 2202 may be a component in a variety of systems. For example, the processor 2202 may be part of a standard personal computer or a workstation. The processor 2202 may be one or more general processors, digital signal processors, application specific integrated circuits, field programmable gate arrays, servers, networks, digital circuits, analog circuits, combinations thereof, or other now known or later developed devices for analyzing and processing data. The processor 2202 may implement a software program, such as code generated manually (i.e., programmed).

The computer system 2200 may include a memory 2204 that can communicate via a bus 2208. The memory 2204 may be a main memory, a static memory, or a dynamic memory. The memory 2204 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 2204 may include a cache or random access memory for the processor 2202. Alternatively or in addition, the memory 2204 may be separate from the processor 2202, such as a cache memory of a processor, the system memory, or other memory. The memory 2204 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 2204 may be operable to store instructions 2224 executable by the processor 2202. The functions, acts or tasks illustrated in the figures or described herein may be performed by the programmed processor 2202 executing the instructions 2224 stored in the memory 2204. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 2200 may further include a display 2214, such as a liquid crystal display (LCD), an organic light emitting diode (OLED), a flat panel display, a solid state display, a cathode ray tube (CRT), a projector, a printer or other now known or later developed display device for outputting determined information. The display 2214 may act as an interface for the user to see the functioning of the processor 2202, or specifically as an interface with the software stored in the memory 2204 or in the drive unit 2206.

Additionally, the computer system 2200 may include an input device 2212 configured to allow a user to interact with any of the components of system 2200. The input device 2212 may be a number pad, a keyboard, or a cursor control device, such as a mouse, or a joystick, touch screen display, remote control or any other device operative to interact with the system 2200.

The computer system 2200 may also include a disk or optical drive unit 2206. The disk drive unit 2206 may include a computer-readable medium 2222 in which one or more sets of instructions 2224, e.g. software, can be embedded. Further, the instructions 2224 may perform one or more of the methods or logic as described herein. The instructions 2224 may reside completely, or at least partially, within the memory 2204 and/or within the processor 2202 during execution by the computer system 2200. The memory 2204 and the processor 2202 also may include computer-readable media as discussed above.

The present disclosure contemplates a computer-readable medium 2222 that includes instructions 2224 or receives and executes instructions 2224 responsive to a propagated signal; so that a device connected to a network 235 may communicate voice, video, audio, images or any other data over the network 235. Further, the instructions 2224 may be transmitted or received over the network 235 via a communication interface 2218. The communication interface 2218 may be a part of the processor 2202 or may be a separate component. The communication interface 2218 may be created in software or may be a physical connection in hardware. The communication interface 2218 may be configured to connect with a network 235, external media, the display 2214, or any other components in system 2200, or combinations thereof. The connection with the network 235 may be a physical connection, such as a wired Ethernet connection or may be established wirelessly as discussed below. Likewise, the additional connections with other components of the system 2200 may be physical connections or may be established wirelessly.

The network 235 may include wired networks, wireless networks, or combinations thereof. The wireless network may be a cellular telephone network, an 802.11, 802.16, 802.20, or WiMax network. Further, the network 235 may be a public network, such as the Internet, a private network, such as an intranet, or combinations thereof, and may utilize a variety of networking protocols now available or later developed including, but not limited to TCP/IP based networking protocols.

The computer-readable medium 2222 may be a single medium, or the computer-readable medium 2222 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 2222 may include a solid-state memory such as a memory card or other package that houses one or more non-volatile read-only memories. The computer-readable medium 2222 also may be a random access memory or other volatile re-writable memory. Additionally, the computer-readable medium 2222 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:

1. A method for tracking a plurality of slabs, the method comprising:
   tagging each of the plurality of slabs with an associated scannable identification tag;
   loading the plurality of slabs onto a plurality of wagons;
   coupling the plurality of wagons;
   moving the plurality of coupled wagons loaded with the plurality of slabs past a tag scanner;
   the tag scanner detecting each of a plurality of the scannable identification tags in association with a time; and
   based on at least one time of detection of each of the plurality of scannable identification tags, identifying a relative location of each slab upon the plurality of coupled wagons.

2. The method of claim 1 further comprising:
   storing the identification of each wagon and each slab in a data store.

3. The method of claim 1 wherein each scannable identification tag in the plurality of scannable identification tags comprises a radio frequency identification (RFID) tag.

4. The method of claim 1 wherein the algorithm comprises:
   detecting, with the tag scanner, a first slab of the plurality of slabs for a first period of time and a second slab of the plurality of slabs for a second period of time; and
   performing an analysis on the first period of time and the second period of time to determine when the first slab and the second slab are upon one wagon or are upon consecutive wagons.

5. The method of claim 4 wherein the analysis on the first period of time and the second period of time to determine when the first slab and the second slab are upon one wagon or are upon consecutive wagons further comprises:
   identifying a time interval threshold, wherein the time interval threshold indicates a maximum allowable time interval between slabs on the same wagon;
   calculating a time interval between a start of the first time period and a start of the second time period; and
   determining that the first slab and the second slab are on the same wagon when the time interval is less than the time interval threshold, otherwise determining that the first slab and the second slab are on consecutive wagons.

6. The method of claim 4 wherein the analysis of the first period of time and the second period of time to determine when the first slab and the second slab are upon one wagon or are upon consecutive wagons further comprises determining that the first slab and the second slab are on the same wagon when the first time period overlaps the second time period, otherwise determining that the first slab and the second slab are on consecutive wagons.

7. The method of claim 4 wherein at least one of the tag scanner, the plurality of slabs, and the plurality of coupled wagons is fixed and at least one of the tag scanner, the plurality of slabs, and the plurality of coupled wagons is moving.

8. A system for tracking a plurality of slabs, the system comprising:
   a tag module for tagging each of the plurality of slabs with an associated scannable identification tag;
   a loading module for loading the plurality of slabs onto a plurality of platforms;
   a coupling module for coupling the plurality of platforms;
   a transportation module for signaling moving of the plurality of coupled platforms loaded with the plurality of slabs past a tag scanner, wherein the tag scanner is operable to detect each of a plurality of the scannable identification tags in association with a time; and
   a location module for identifying a relative location of each slab upon the plurality of coupled platforms based on at least on the time of detection of each of the plurality of scannable identification tags.

9. The system of claim 8 further comprising
   a storage module for storing the identification of each platform and each slab in a data store.

10. The system of claim 8 wherein each scannable identification tag in the plurality of scannable identification tags comprises a radio frequency identification tag.

11. The system of claim 8 wherein the algorithm comprises:
    detecting, with an the tag scanner, a first slab of the plurality of slabs for a first period of time and a second slab of the plurality of slabs for a second period of time; and
    performing an analysis on the first period of time and the second period of time to determine when the first slab and the second slab are upon one platform or are upon consecutive platforms.

12. The system of claim 11 wherein the analysis of the first period of time and the second period of time to determine when the first slab and the second slab are upon one platform or are upon consecutive platforms further comprises determining that the first slab and the second slab are on the same platform when the first time period overlaps the second time period, otherwise determining that the first slab and the second slab are on consecutive platforms.

13. The system of claim 8 wherein the plurality of coupled platforms comprises a plurality of train wagons.

14. The method of claim 1 wherein each tag in the plurality of tags comprises a barcode tag.

* * * * *